United States Patent

Yamato

(10) Patent No.: US 12,346,236 B2
(45) Date of Patent: Jul. 1, 2025

(54) OFFLOAD SERVER, OFFLOAD CONTROL METHOD, AND OFFLOAD PROGRAM

(71) Applicant: Nippon Telegraph and Telephone Corporation, Tokyo (JP)

(72) Inventor: Yoji Yamato, Musashino (JP)

(73) Assignee: Nippon Telegraph and Telephone Corporation, Tokyo (JP)

( * ) Notice: Subject to any disclaimer, the term of this patent is extended or adjusted under 35 U.S.C. 154(b) by 148 days.

(21) Appl. No.: 18/248,637

(22) PCT Filed: Oct. 12, 2020

(86) PCT No.: PCT/JP2020/038416
§ 371 (c)(1),
(2) Date: Apr. 11, 2023

(87) PCT Pub. No.: WO2022/079748
PCT Pub. Date: Apr. 21, 2022

(65) Prior Publication Data
US 2023/0385178 A1    Nov. 30, 2023

(51) Int. Cl.
*G06F 11/3604* (2025.01)
*G06F 11/3698* (2025.01)

(52) U.S. Cl.
CPC ...... *G06F 11/3612* (2013.01); *G06F 11/3698* (2025.01)

(58) Field of Classification Search
USPC ........................................................ 717/126
See application file for complete search history.

(56) References Cited

U.S. PATENT DOCUMENTS

2006/0037007 A1\* 2/2006 Snyder ...................... G06F 8/30
717/136
2009/0144744 A1\* 6/2009 Gunnels ................ G06F 9/4881
703/20

(Continued)

FOREIGN PATENT DOCUMENTS

JP        2020137017      8/2020
WO   WO 2020090142      7/2020

OTHER PUBLICATIONS

International Search Report in International Appln. No. PCT/JP2020/038416, dated Feb. 22, 2021, 6 pages (with English Translation).

(Continued)

*Primary Examiner* — Bradley A Teets
*Assistant Examiner* — Clint Thatcher
(74) *Attorney, Agent, or Firm* — Fish & Richardson P.C.

(57) ABSTRACT

An offload server includes a code analysis section for analyzing whether function blocks executable by an accelerator is included, a processing pattern generation section for generating patterns for offloading the function blocks, and a performance measurement section for deploying each pattern for offloading the function blocks to a verification machine to measure performance. When the performance measured by the performance measurement section satisfies a desired level, the processing pattern generation section generates patterns for offloading remaining loop statements except the function blocks, and the performance measurement section deploys each pattern to a verification environment to measure performance. When the performance measured by the performance measurement section fails to satisfy the desired level, the processing pattern generation section generates patterns for offloading loop statements, and the performance measurement section deploys each (Continued)

pattern to the verification environment to measure performance.

4 Claims, 18 Drawing Sheets

(56) References Cited

U.S. PATENT DOCUMENTS

| | | | |
|---|---|---|---|
| 2013/0042088 A1* | 2/2013 | Archer | G06F 15/78 |
| | | | 712/30 |
| 2018/0032255 A1* | 2/2018 | Hayashi | G06F 13/102 |
| 2019/0197653 A1* | 6/2019 | Artico | G06F 8/4442 |
| 2021/0357194 A1* | 11/2021 | Guo | G06F 8/315 |
| 2021/0405981 A1 | 12/2021 | Yamato et al. | |
| 2022/0188086 A1 | 6/2022 | Yamato | |

OTHER PUBLICATIONS

Tsunashima et al., "Study of Programing Environments for Describing GPU-FPGA Cooperative Computing", IPSJ SIG Technical Report, May 3, 2019, 2019-HPC-169(10):1-9 (No Translation).

Yamato et al., "Proposal of Environment Adaptive Software," The 2nd International Conference on Control and Computer Vision (ICCCV 2019), Jun. 2019, 102-108.

Yamato, "Proposal of Automatic FPGA Offloading for Applications Loop Statements," The 7th Annual Conference on Engineering and Information Technology (ACEAIT 2020), 2020, pp. 111-123.

Yamato, "Proposal of Automatic Offloading for Function Blocks of Applications," The 8th IIAE International Conference on Industrial Application Engineering 2020 (ICIAE 2020), Mar. 2020, pp. 4-11, 8 pages.

Yamato, "Study of parallel processing area extraction and data transfer No. reduction for automatic GPU offloading of IoT applications," Journal of Intelligent Information Systems, Springer, Aug. 2019, 567-584.

* cited by examiner

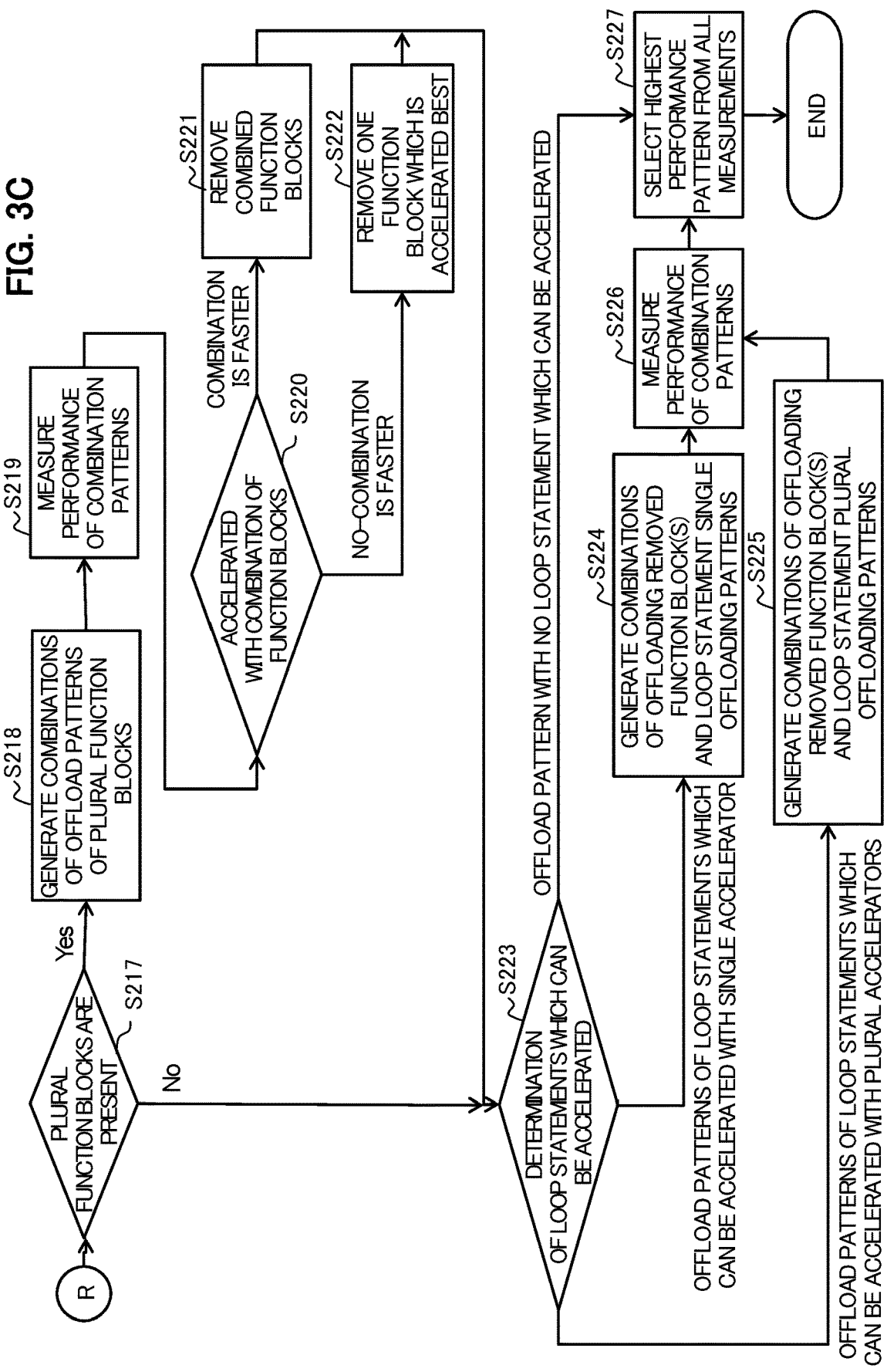

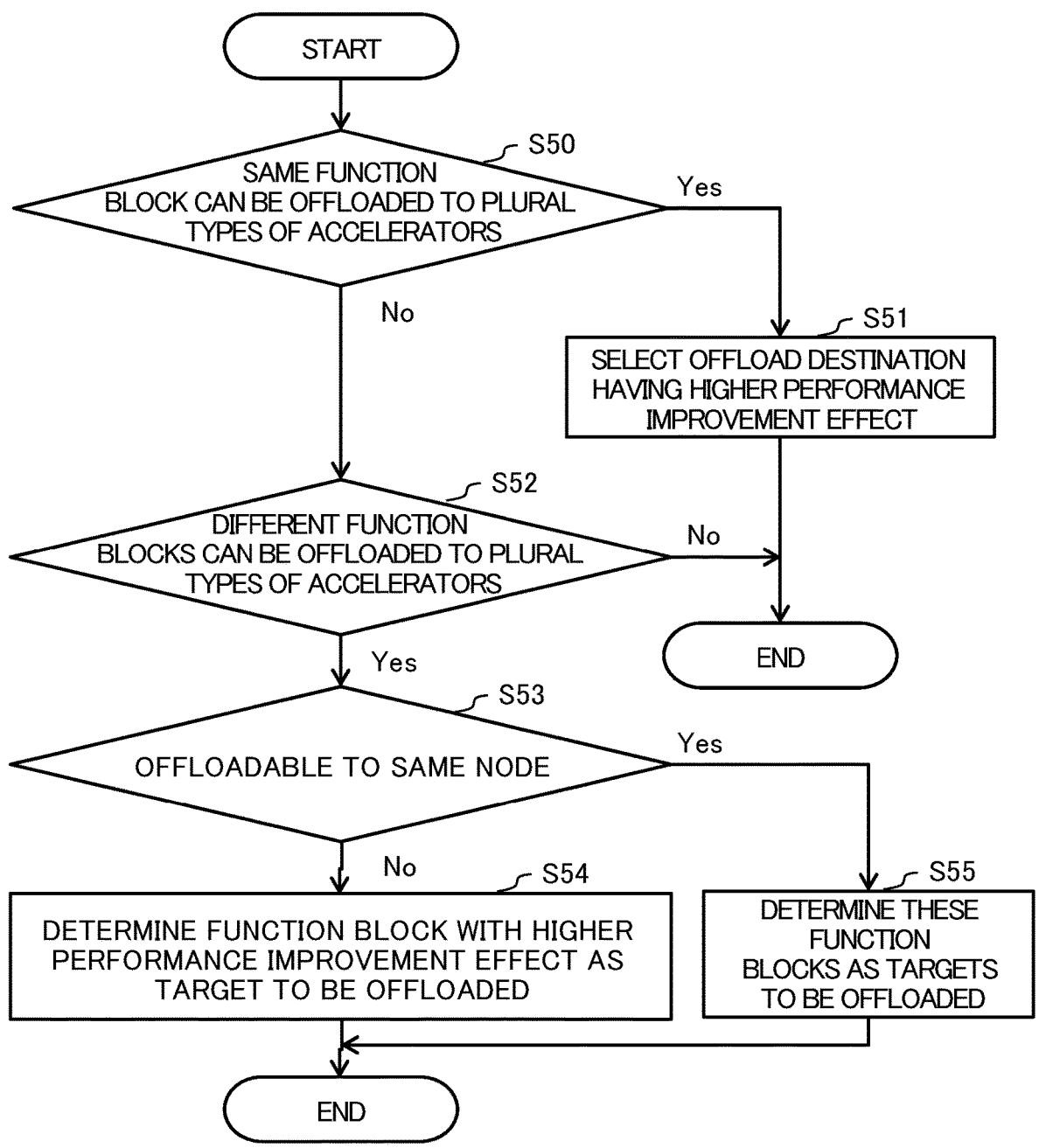

OFFLOAD SERVER, OFFLOAD CONTROL METHOD, AND OFFLOAD PROGRAM

CROSS-REFERENCE TO RELATED APPLICATIONS

This is a National Stage Application of PCT Application No. PCT/JP2020/038416, filed on Oct. 12, 2020. The disclosure of the prior application is considered part of the disclosure of this application, and is incorporated in its entirety into this application.

TECHNICAL FIELD

The present invention relates to an offload server, an offload control method, and an offload program for offloading a software processing program to be processed by an ordinary CPU (Central Processing Unit) so as to process the software processing program at high speed in an environment where accelerators such as a GPU (Graphics Processing Unit), an FPGA (Field Programmable Gate Array), and a many-core CPU coexist.

BACKGROUND ART

In recent years, it is said that the Moore's law, which states that the semiconductor integration of CPUs doubles in 1.5 years, could be decelerated. From such a situation, not only few-core CPUs, but also devices such as FPGAs and GPUs are increasingly utilized. For example, Microsoft Corporation uses FPGA to increase the efficiency of search engines. Amazon, Inc. provides FPGAs, GPUs, etc. as instances of a cloud.

However, in order to appropriately utilize devices other than general few-core CPUs in the system, settings and program development in consideration of device characteristics are required. That is, as the knowledge of OpenMP (registered trademark) (Open Multi-Processing), OpenCL (registered trademark) (Open Computing Language), CUDA (register trademark) (Compute Unified Device Architecture) is required, there is a high wall of skill for most of the programmers. Note that recitation of (registered trademark) will be omitted for OpenMP (registered trademark), OpenCL (registered trademark), and CUDA (registered trademark) hereinafter.

Although it is expected that systems utilizing accelerators such as the GPU, the FPGA, and the many-core CPU other than few-core CPUs are increasing more and more in the future, there is a high technical wall for the programmer to utilize these systems to the maximum. In order to remove such a wall and to sufficiently utilize accelerators other than few-core CPUs, there is a need of a platform that adaptively performs conversions and makes settings to software in which processing logic is described by a programmer, according to an environment (FPGA, GPU, many-core CPU, or the like) of the deployment destination, to cause the software to perform operations suitable to the environment.

In view of this, in Non-Patent Literature 1, the inventor has proposed environment adaptive software aimed at automatically performing conversions, resource settings, and the like so that code described once is utilized by a GPU, an FPGA, and/or a many-core CPU that exists in the environment of the deployment destination thereby to operate an application in a high performance.

The inventor has proposed techniques of automatically offloading loop statements and function blocks of source code to an FPGA and/or a GPU as elements of environment adaptive software in Non-Patent Literatures 2, 3, and 4.

CITATION LIST

Non-Patent Literature

[Non-Patent Literature 1] Y. Yamato, H. Noguchi, M. Kataoka and T. Isoda, "Proposal of Environment Adaptive Software," The 2nd International Conference on Control and Computer Vision (ICCCV 2019), pp. 102-108, Jeju, June 2019

[Non-Patent Literature 2] Y. Yamato, "Study of parallel processing area extraction and data transfer number reduction for automatic GPU offloading of IoT applications," Journal of Intelligent Information Systems, Springer, DOI: 10.1007/s10844-019-00557-8, August 2019.

[Non-Patent Literature 3] Y. Yamato, "Proposal of Automatic FPGA Offloading for Applications Loop Statements," The 7th Annual Conference on Engineering and Information Technology (ACEAIT 2020), pp. 111-123, 2020

[Non-Patent Literature 4] Y. Yamato, "Proposal of Automatic Offloading for Function Blocks of Applications," The 8th IIAE International Conference on Industrial Application Engineering 2020 (ICIAE 2020), pp. 4-11, March 2020

SUMMARY OF INVENTION

Technical Problem

In recent years, CUDA has been widely used as an environment for performing a GPGPU (General Purpose GPU), which uses parallel computation power of a GPU also for a non-image processing. CUDA is an environment for GPGPU developed by NVIDIA Co.

Further, OpenCL has been developed as specifications for handling heterogeneous devices such as FPGAs, many-core CPUs, GPUs, or the like in the same manner, and the development environment thereof also has been developed. CUDA and OpenCL are used for programming with C language with extensions, which allow describing copy and release operations on memory data between a kernel such as an FPGA and a CPU of the host. The difficulty in the programming is high.

In order to use heterogeneous devices more easily than CUDA and OpenCL, there is a technique of designating portions where parallel processing or the like is to be performed using instruction lines, based on which a compiler generates an execution file for a GPU, a many-core CPU, or the like. As the specifications, OpenACC (registered trademark) (OpenACCelerators), OpenMP, and the like exist, and as the compilers, PGI compiler, gcc, and the like exist. Note that recitation of (registered trademark) will be omitted for OpenACC (registered trademark) hereinafter.

By using technical specifications such as CUDA, OpenCL, OpenACC, OpenMP, and the like, it is possible to perform offloading to an FPGA, a GPU, or a many-core CPU. However, even if the accelerator processing itself can be performed, there is a problem in accelerating.

For example, Intel compiler or the like is available as a compiler having an automatic parallelization function for a multi-core CPU. Such a compiler performs parallelization by extracting parallelizable portions in a loop statement in the codes at the time of automatic parallelization. However, outstanding performance is often not achieved by simply parallelizing parallelizable loop statements due to the influence of memory processing or the like. Here, the loop statement refers to for/while/do-while in the case of C/C++ source code.

More specifically, to accelerate with an FPGA, a GPU, and the like, engineers of OpenCL and CUDA repeats tuning, or tries to search for an appropriate parallel processing area by using OpenACC compiler, etc. Therefore, it is difficult for a programmer with poor technical skill to increase the speed of an application by utilizing an FPGA, a GPU, and/or a many-core CPU. In addition, when using an automatic parallelization technique or the like, it is necessary to search for parallel processing portions in a trial and error fashion.

In the present situation, the mainstream of offloading for heterogeneous devices is by manual work. The inventor proposes a concept of environment adaptive software and is examining automatic offloading. However, offloading to a GPU alone is assumed but a migration destination environment where various accelerators such as a GPU, an FPGA, a many-core CPU, or the like coexist is not assumed.

In view of this, a problem to be solved by the present invention to provide an offload server, an offload control method, and an offload program that improve the performance automatically even when the migration destination is an environment in which a plurality of types of accelerators coexist.

Solution to Problem

In order to solve the above problem, an offload server of the present invention is characterized by including: one or more hardware processors; a code analysis section, implemented using one or more of the one or more hardware processors, configured to analyze whether a source code of a software program includes at least one function block executable by at least one accelerator; a processing pattern generation section, implemented using one or more of the one or more hardware processors, configured to generate a first plurality of patterns for offloading the at least one function block to the at least one accelerator; a performance measurement section, implemented using one or more of the one or more hardware processors, configured to deploy each of the first plurality of patterns for offloading the at least one function block to a verification environment to measure a first performance; and a control section, implemented using one or more of the one or more hardware processors, configured to, when the first performance measured by the performance measurement section satisfies a desired level, generate a second plurality of patterns for offloading at least one remaining loop statement except the at least one function block in the software program by the processing pattern generation section, and deploy each of the second plurality of patterns to the verification environment to measure a second performance by the performance measurement section, and when the first performance measured by the performance measurement section fails to satisfy the desired level, generate a third plurality of patterns for offloading at least one loop statement of the software program by the processing pattern generation section, and deploy each of the third plurality of patterns to the verification environment to measure a third performance by the performance measurement section.

Other means will be described in the description of modes for carrying out the invention.

Advantageous Effects of Invention

According to the present invention, even if the environment in which the plurality of types of accelerators coexist is the migration destination, the performance can be automatically improved. Further, when the migration destination has a plurality of types of accelerators in the same node, offloading is performed to the plurality of types of accelerators at the same time, thereby achieving faster offloading than in the case of using a single accelerator.

BRIEF DESCRIPTION OF THE DRAWINGS

FIG. 3C is a flowchart of selection processing of patterns to be offloaded to accelerators.

FIG. 4A is a flowchart of processing of offloading function blocks to one node.

FIG. 5A is a flowchart of the selection processing of the patterns for offloading the function blocks to the accelerator.

DESCRIPTION OF EMBODIMENTS

Figure 1:
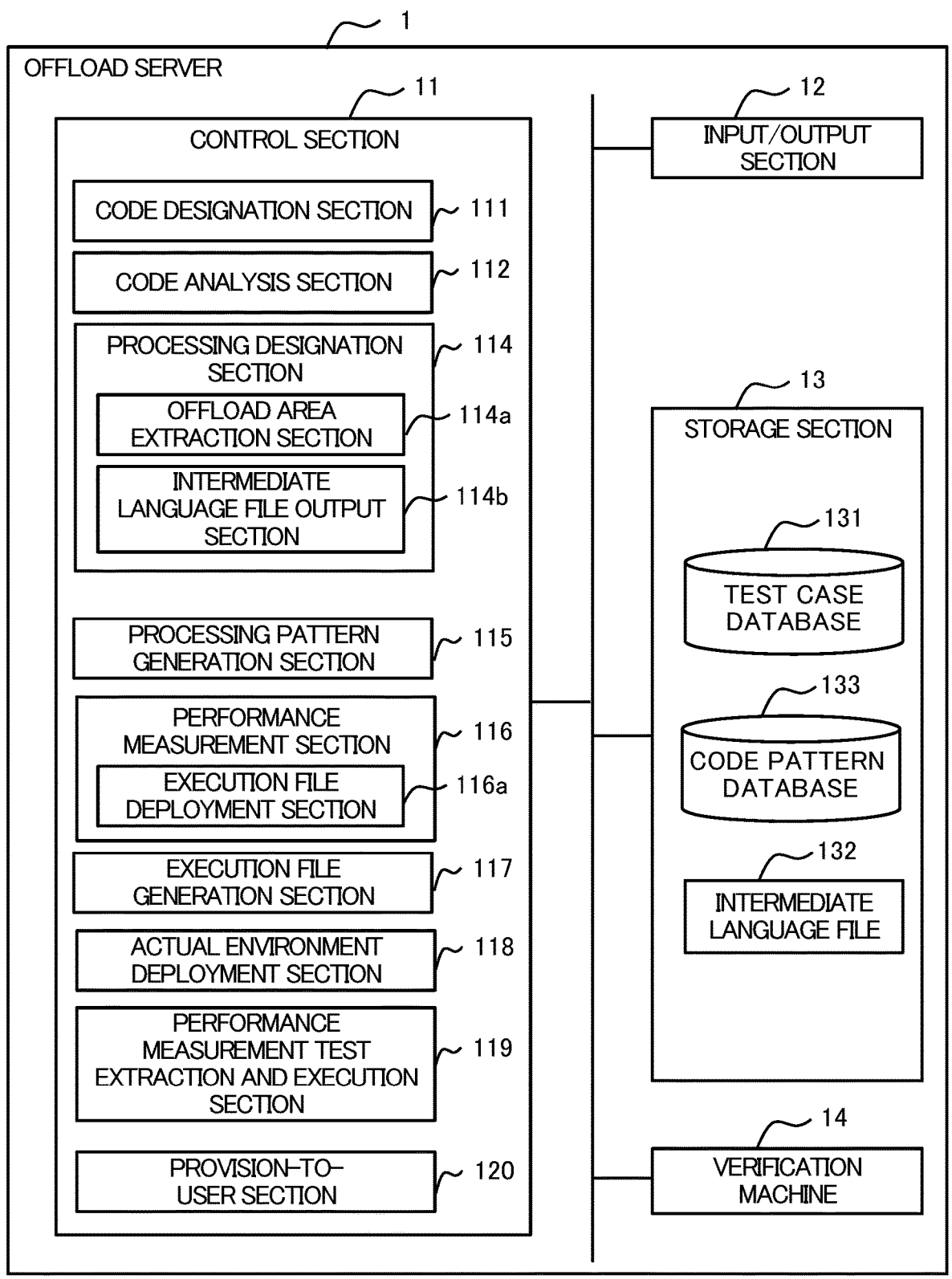
FIG. 1 is a function block diagram illustrating a configuration example of an offload server.

Hereinafter, an embodiment of the present invention will be described in detail with reference to the drawings.

In order to embody the concept of environment adaptive software, the present inventor has proposed schemes for GPU automatic offloading of loop statements of a program, FPGA automatic offloading, and automatic offloading of function blocks of a program, so far. In view of these element technology studies, targets regarding the migration destination environment are defined, and basic idea that follows even when the targets are diversified is described. Moreover, proposals are given for automatic offloading to individual migration destination environments and an automatic offload method in the case where the migration destination environment is diversified.

<<Basic Idea on Migration to Various Environments>>

The various migration destination environments targeted in the present embodiment are three of GPU, FPGA, and many-core CPU. GPUs and FPGAs have a deep history as heterogeneous hardware different from CPUs. There are many cases of acceleration by manual offloading using CUDA and OpenCL, and the market is large. In addition, regarding many-core CPUs, CPUs having a large number of cores of 16 or more cores comes to the market in recent years even at a low cost of one thousand dollars to several thousand dollars. There are some cases of acceleration by performing parallelization by using technical specifications such as OpenMP and by performing tuning by manual work.

In order to automatically perform offloading at high speed in cases where the migration destination environment is not only a simple CPU, we take an approach of measuring the performance using an actual machine in a verification environment in combination with a method such as an evolutionary computation technique, thereby to gradually find a high-speed offload pattern.

This is similar to the case of GPU offloading or the like proposed by the inventor. This is because we believe that the performance greatly changes in a manner depending on not only the code structure, but also on the specifications of the hardware and on the actual processing regarding the data size and the number of loop iterations, etc., which makes it difficult to predict the performance statically, and therefore dynamic measurement is required. In the market, there are automatic parallelizing compilers that find and parallelize loop statements at a compilation stage. However, it is considered that performance measurement is necessary because there are many cases where only parallelizing the parallelizable loop statements results in a low speed when the performance is measured.

The target to be offloaded is loop statements and function blocks of the program. This is the same as the cases of the GPU offloading and FPGA offloading, etc. which have been studied so far. Regarding the loop statements, the loop statement are considered as an offload target because most of the processing of the program which takes a long processing time has been spent in the loops.

On the other hand, regarding the function blocks, as an algorithm suitable for processing content and for the processing hardware is often used to increase the speed of specific processing of a function block, it is possible to accelerate the speed largely in some cases as compared with parallel processing or the like of individual loop statements. In the present embodiment, the processing speed is accelerated by replacing the processing with processing (IP core, CUDA library, and the like) implemented using an algorithm based on an accelerator such as a many-core CPU, FPGA, GPU, in units of frequently used function blocks such as matrix multiplication and Fourier transformation.

FIG. 1 is a function block diagram illustrating a configuration example of an offload server 1.

The offload server 1 is a device that automatically offloads specific processing of an application to an accelerator such as a GPU, an FPGA or a many-core CPU.

As illustrated in FIG. 1, the offload server 1 includes a control section 11, an input/output section 12, a storage section 13, and a verification machine 14 (an accelerator verification device).

The input/output section 12 includes a communication interface 950 (see FIG. 2) for transmitting and receiving information to and from devices belonging to a cloud layer 2, a network layer 3, and a device layer 4, and an input/output interface 960 (see FIG. 2) for transmitting and receiving information to and from input devices such as a touch panel or a keyboard and output devices such as a monitor.

The storage section 13 is composed of a hard disk, a flash memory, a RAM (Random Access Memory), and the like. The storage section 13 stores a test case database 131 and a code pattern database 133, and temporarily stores a program (offload program) for executing functions of the control section 11, and information required for the processing of the control section 11, for example, such as an intermediate language file 132.

The test case database 131 stores data of test items for the software to be verified. For example, for a database system such as MySQL, a transaction test such as TPC-C is stored. The code pattern database 133 stores accelerator libraries or accelerator IP cores which are usable for replacement and correspond to library names.

The verification machine 14 includes an accelerator such as a GPU, an FPGA, and/or a many-core CPU as the verification environment of the environment adaptive software system.

The control section 11 is an automatic offloading function section that governs the control of the entire offload server 1. The control section 11 is embodied by, for example, executing a program (offload program) stored in the storage section 13 by the CPU 910 of FIG. 2.

The control section 11 includes a code designation section 111, a code analysis section 112, a processing designation section 114, a processing pattern generation section 115, a performance measurement section 116, an execution file generation section 117, an actual environment deployment section 118, a performance measurement test extraction and execution section 119, and a provision-to-user section 120.

<<Code Designation Section 111>>

The code designation section 111 designates an inputted source code. Specifically, the code designation section 111 passes the source code described in the received file to the code analysis section 112.

<<Code Analysis Section 112>>

The code analysis section 112 analyzes the source code of the software program to identify loop statements such as for/do-while/while loops, and function blocks such as an FFT library, a matrix operation, a random number generation. These loop statements and function blocks can be executed by an accelerator.

<<Processing Designation Section 114>>

The processing designation section 114 replaces each function block with processing for offloading to the accelerator and performs compilation, and, for each loop statement, specifies a statement specifying application of parallel processing to be offloaded to the accelerator and performs compilation. The processing designation section 114 includes an offload area extraction section 114a and an intermediate language file output section 114b.

The offload area extraction section 114a identifies processing offloadable to the many-core CPU, the GPU, and the FPGA, such as for/do-while/while loop statements and function blocks such as FFT, matrix operation, and random number generation, to extract offload areas. The intermediate language file output section 114b outputs an intermediate language file 132 of the extracted offloadable processing. The intermediate language extraction is not terminated at one time, but is repeated for optimization through execution trials to search for appropriate offload areas.

<<Processing Pattern Generation Section 115>>

The processing pattern generation section 115 generates a pattern for offloading the function blocks and the loop statements to the accelerator based on the extracted offload areas.

When a GPU is used as the accelerator for loop statements, processing pattern generation section 115 excludes, from loop statements to be offloaded, any loop statement (iteration statements) at which a compilation error occurs and generates parallel processing patterns which specify whether to perform parallel processing for the loop statements at which no compilation error occurs.

<<Performance Measurement Section 116>>

The performance measurement section 116 compiles the source code according to the processing pattern, deploys the compilation result to the verification machine 14, and performs processing for measuring the performance obtained when offloading to the accelerator is performed.

The performance measurement section 116 includes a binary file deployment section 116a. The binary file deployment section 116a deploys an execution file derived from the intermediate language to the verification machine 14 equipped with the many-core CPU, GPU, and FPGA.

The performance measurement section 116 executes the deployed binary file, measures the performance obtained when offloading is performed, and returns the result of the performance measurement to the processing pattern generation section 115. In this case, the processing pattern generation section 115 generates another offload pattern. The performance measurement section 116 performs performance measurements for trial on the other generated offload pattern.

<<Execution File Generation Section 117>>

The execution file generation section 117 selects an offload pattern with the highest processing performance from a plurality of offload patterns on the basis of the result of the performance measurement repeated for a predetermined number of times and compiles the selected offload pattern with the highest processing performance to generate an execution file.

<<Actual Environment Deployment Section 118>>

The actual environment deployment section 118 deploys the generated execution file to the actual environment for user ("deployment of final binary file to actual environment"). The actual environment deployment section 118 determines a pattern that designates the final offload areas, and deploys the pattern to the actual environment for the user.

<<Performance Measurement Test Extraction and Execution Section 119>>

After the execution file is deployed, a performance measurement test extraction and execution section 119 extracts performance test items from the test case database 131 and performs a performance test ("deployment of final binary file to actual environment").

After the execution file is deployed, the performance measurement test extraction and execution section 119 extracts performance test items from the test case database 131, and performs an automatic execution of the extracted performance test in order to indicate the performance to the user.

<<Provision-to-User Section 120>>

The provision-to-user section 120 presents information on the price, performance and the like to the user based on the result of the performance test ("provision of information on price, performance and the like to user"). The test case database 131 stores data of test items for the software to be verified. The provision-to-user section 120 presents, to the user, data of the performance and the like obtained by executing the test items stored in the test case database 131 and data of price information and the like of resources (virtual machines, GPUs, etc.) to which the user software is to be deployed. Based on the presented information on the price, performance and the like, the user determines whether to start using the service with billing.

[Application of Genetic Algorithm]

The offload server 1 can use a genetic algorithm for optimizing the offloading. A configuration of the offload server 1 using a genetic algorithm is as follows.

Specifically, the processing designation section 114 uses the number of loop statements (iteration statements) as the gene length, according to a genetic algorithm. The processing pattern generation section 115 maps accelerator processing availability to a gene pattern in such a manner that performing accelerator processing is assigned either 1 or 0 and not performing accelerator processing is assigned either the opposite 0 or 1.

When using the genetic algorithm, the processing pattern generation section 115 prepares as many gene patterns as the specified number of individuals, wherein values of genes of the gene patterns are randomly set as either 1 or 0. The performance measurement section 116 compiles, according to each of the individuals, a source code in which statements specifying application of parallel processing by an accelerator are specified and deploys the compiled code to the verification machine 14. The performance measurement section 116 executes processing for measuring the performance on the verification machine 14.

When using the genetic algorithm and when a gene having the same parallel processing pattern as a former gene appears in an intermediate generation, the performance measurement section 116 does not perform compilation of the source code corresponding to the parallel processing pattern and does not perform performance measurement and uses the same performance measurement value. In addition, for a source code that causes a compilation error and for a source code with which the performance measurement does not finish within a predetermined time, the performance measurement section 116 handles these cases as time-out cases and sets the performance measurement value to a predetermined time (a long time).

The execution file generation section 117 performs the performance measurement for all the individuals and evaluates them in such a manner that an individual with a shorter processing time is judged as having a higher degree of fitness. The execution file generation section 117 selects, from all the individuals, individuals having degrees of fitness higher than a predetermined value (e.g., top n percent of all the individuals or top m individuals, where n and m are natural numbers) as individuals with high performance and performs crossover and mutation processes on the selected individuals to generate individuals of the next generation. After processing for a specified number of generations has been completed, the execution file generation section 117 selects a parallel processing pattern with the highest performance as the solution.

Figure 2:
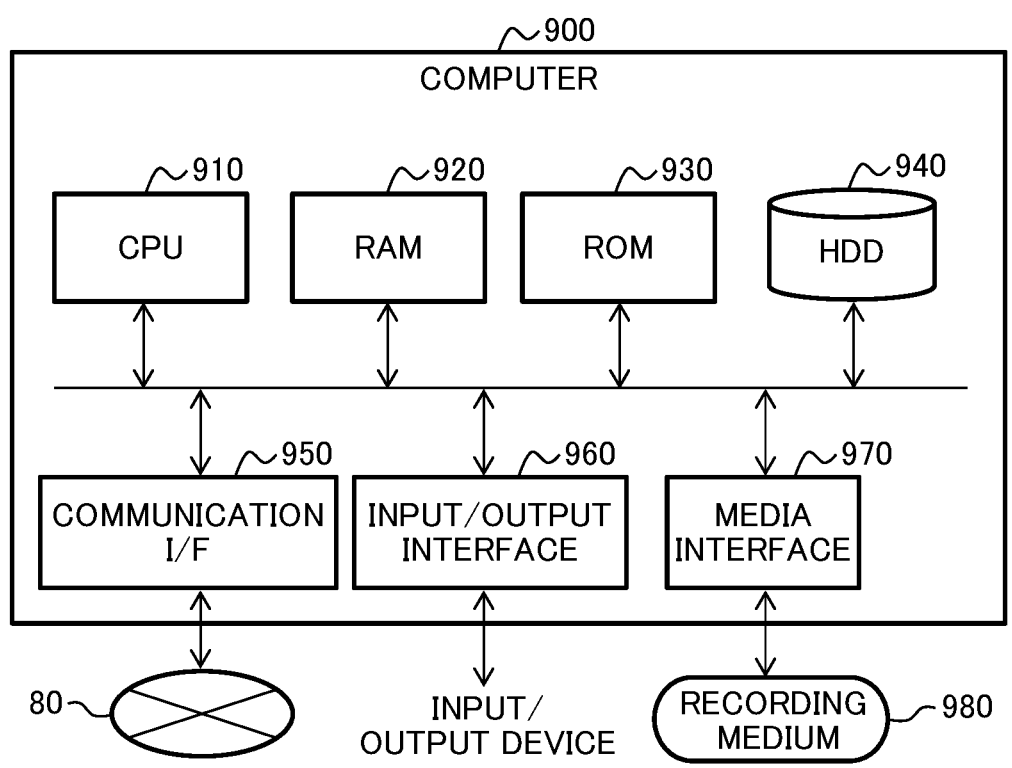
FIG. 2 is a hardware configuration diagram illustrating an example of a computer which embodies the functions of the offload server.

FIG. 2 is a hardware configuration diagram illustrating an example of a computer that embodies the functions of the offload server.

Computer 900 includes a CPU 910, a RAM 920, a ROM 930, an HDD 940, a communication interface 950, an input/output interface 960, and a media interface 970.

CPU 910 operates and performs control of each portion according to a program stored in ROM 930 or HDD 940. ROM 930 stores a boot program to be executed by CPU 910 when computer 900 starts up, a program that relies on the hardware of computer 900, and the like.

HDD 940 stores programs to be executed by CPU 910, data to be used by the programs, and the like. Communication interface 950 receives data from another device via a communication network 80, sends the received data to CPU 910, and transmits data generated by CPU 910 to another device via communication network 80.

CPU 910 controls an output device such as a display or a printer and an input device such as a keyboard or a mouse via input/output interface 960. CPU 910 receives data from the input device via input/output interface 960. Also, CPU 910 outputs generated data to the output device via input/output interface 960.

Media interface 970 reads a program or data stored in a recording medium 980 and provides the read program or data to CPU 910 via RAM 920. CPU 910 loads the program from recording medium 980 onto RAM 920 via media interface 970 and executes the loaded program. Recording medium 980 is, for example, an optical recording medium such as a DVD (Digital Versatile Disc), a magneto-optical recording medium such as an MO (Magneto Optical disk), a tape medium, a magnetic recording medium, a semiconductor memory, or the like.

For example, when computer 900 functions as an offload server 1 according to the present embodiment, CPU 910 of computer 900 embodies the function of each portion of offload server 1 by executing the program loaded on RAM 920. Also, HDD 940 stores the data of each portion of offload server 1. CPU 910 of computer 900 reads these programs from recording medium 980 and executes them, but in another example, these programs may be received from another device via communication network 80.

Figure 3A:
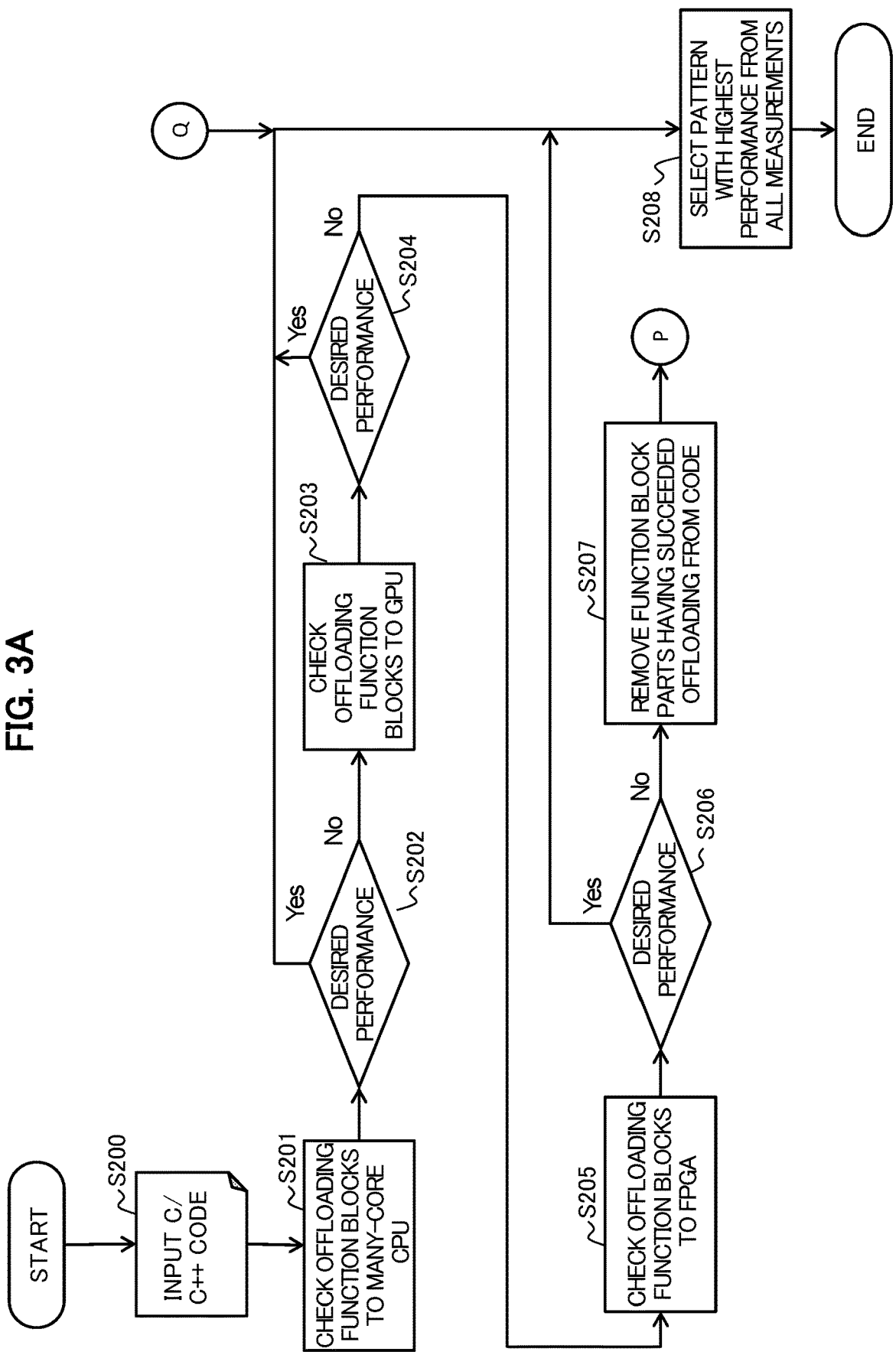
FIG. 3A is a flowchart of selection processing of patterns to be offloaded to accelerators.
Figure 3B:
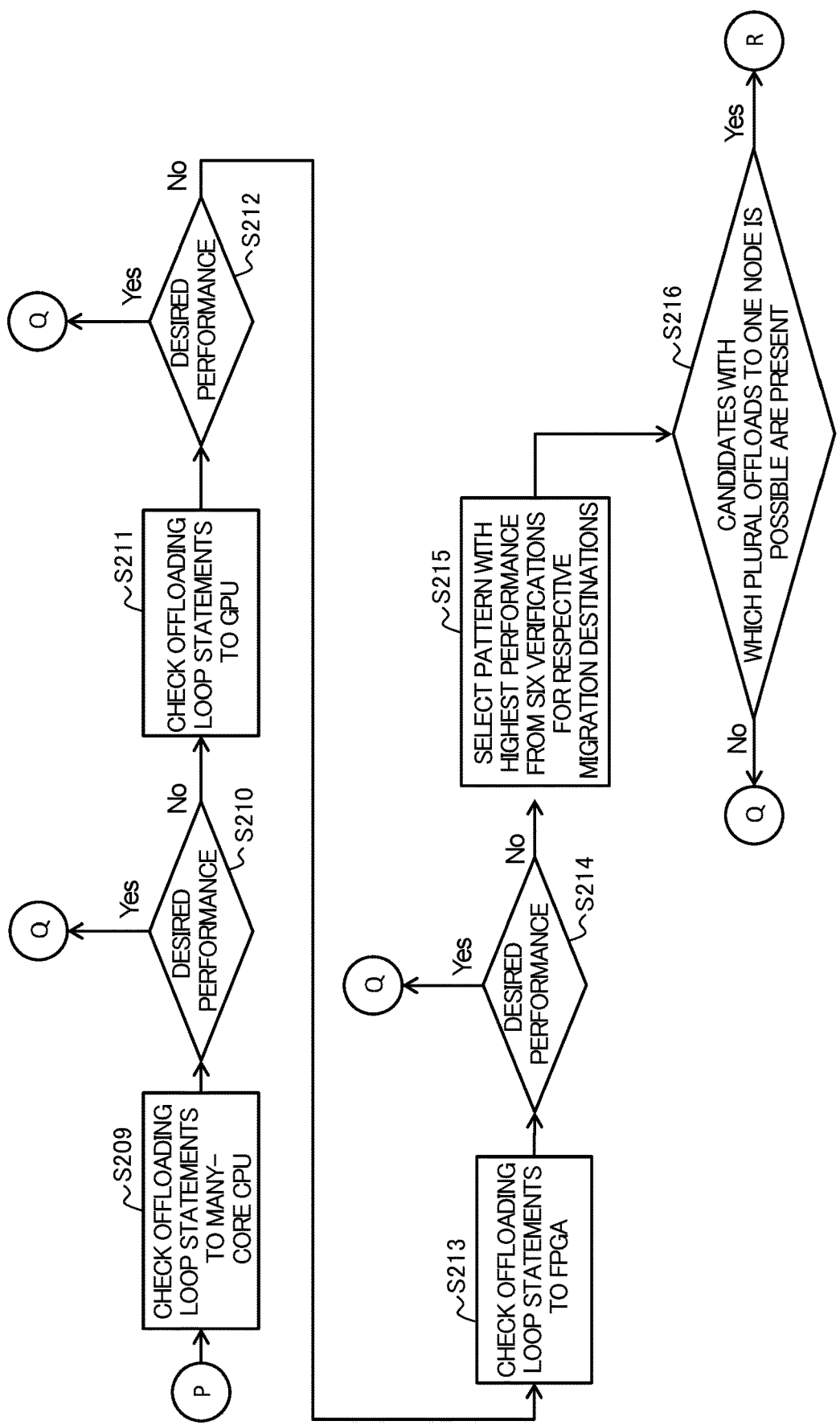
FIG. 3B is a flowchart of selection processing of patterns to be offloaded to accelerators.

FIGS. 3A, 3B, and 3C are flowcharts of selection processing of the pattern to be offloaded to the accelerator.

The offload server 1 examines automatic offloading to three migration destination environments of a GPU, an FPGA, and a many-core CPU by using two schemes of processing function blocks and processing loop statements.

When a C/C++ source code is inputted (S200), the control section 11 executes a series of processing of selecting offload patterns. The control section 11 calls the selection processing illustrated in FIGS. 5A and 5B to check (S201) offloading of function blocks to the many-core CPU, and determines (S202) whether the desired performance is obtained (S202). When the desired performance is obtained (Yes), the control section 11 selects (S208) a pattern with the highest performance from all the measurements, and terminates the processing illustrated in this diagram. When the desired performance is not obtained (No), the control section 11 proceeds to step S203.

Figure 5A:
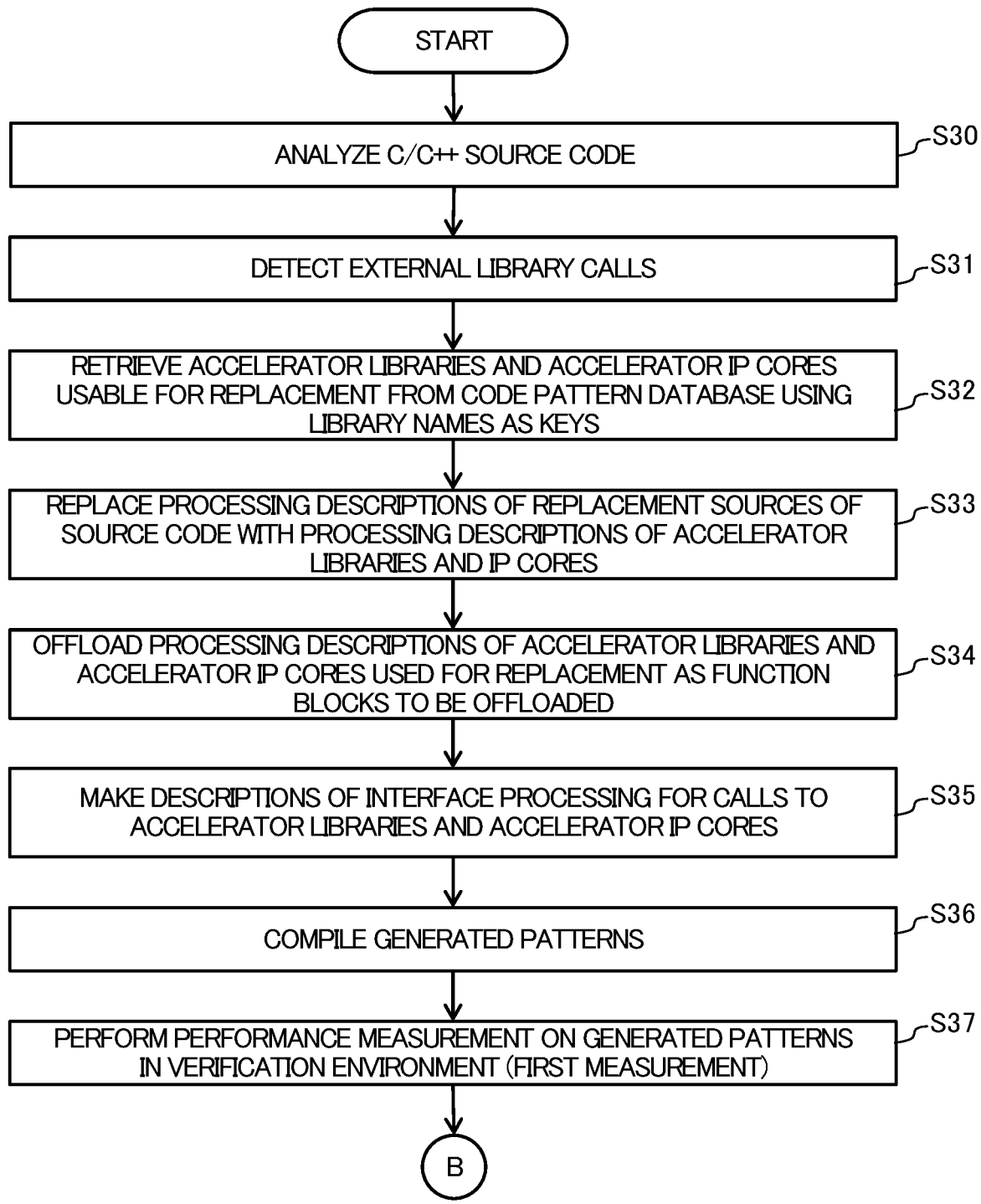
FIG. 5A is a flowchart of selection processing of patterns for offloading function blocks to an accelerator.
Figure 5B:
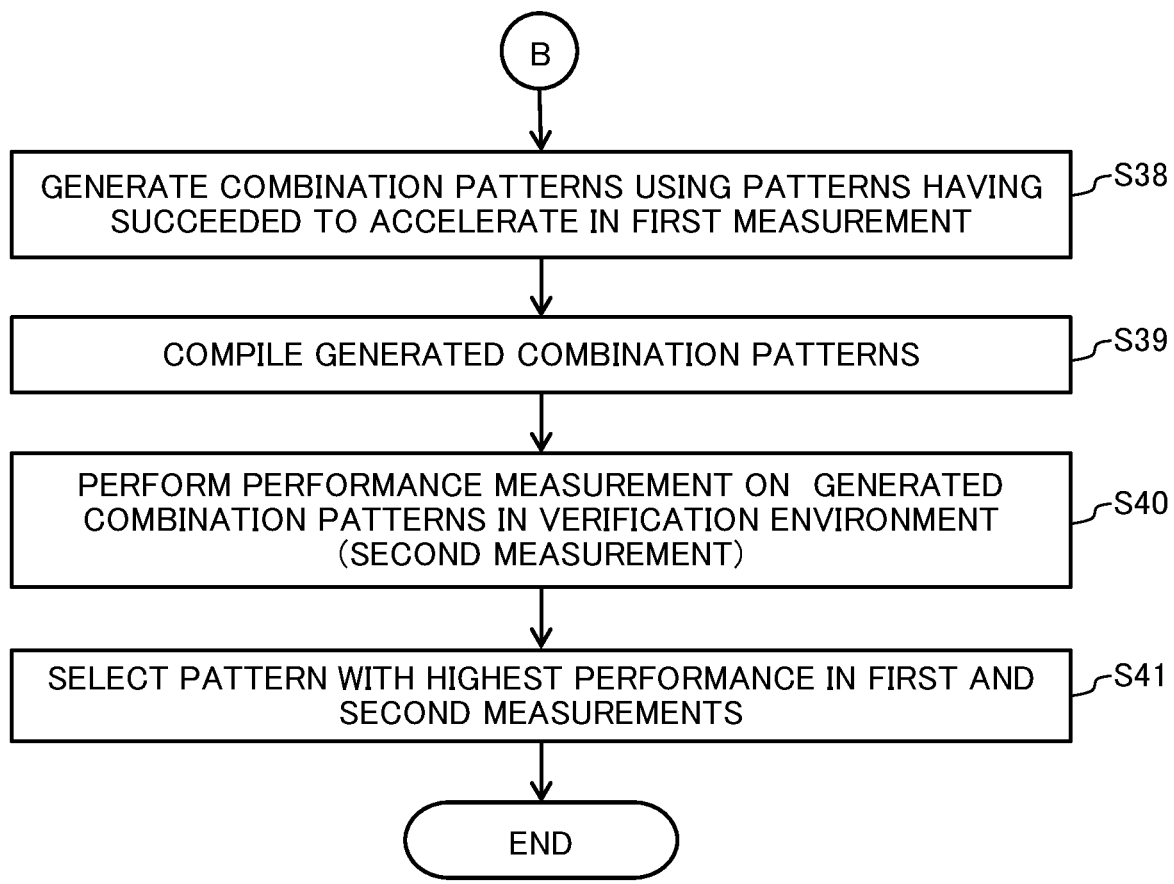

In step S203, the control section 11 calls the selection processing illustrated in FIGS. 5A and 5B to check offloading of function blocks to the GPU. Then, the control section 11 determines (S204) whether the desired performance is obtained. When the desired performance is obtained (Yes), the control section 11 selects (S208) a pattern with the highest performance from all the measurements, and termi-nates the processing illustrated in this diagram. When the desired performance is not obtained (No), the control section 11 proceeds to step S205.

In step S205, the control section 11 calls the selection processing illustrated in FIGS. 5A and 5B to check offloading of function blocks to the FPGA. Then, the control section 11 judges (S206) whether the desired performance is obtained. When the desired performance is obtained (Yes), the control section 11 selects (S208) a pattern with the highest performance from all the measurements, and terminates the processing of this diagram. When desired performance is not obtained (No), the control section 11 removes portions where offloading of function blocks has succeeded from the code, and proceeds to step S209 in FIG. 3B.

By the processing of these steps from S201 to S208, the performance of the function blocks can be automatically improved even when the environment in which a plurality of types of accelerators coexist is the migration destination. Further, the control section 11 tries the many-core CPU, the GPU, and the FPGA in this order, which makes it possible to efficiently search for patterns with which acceleration is possible.

Figure 9A:
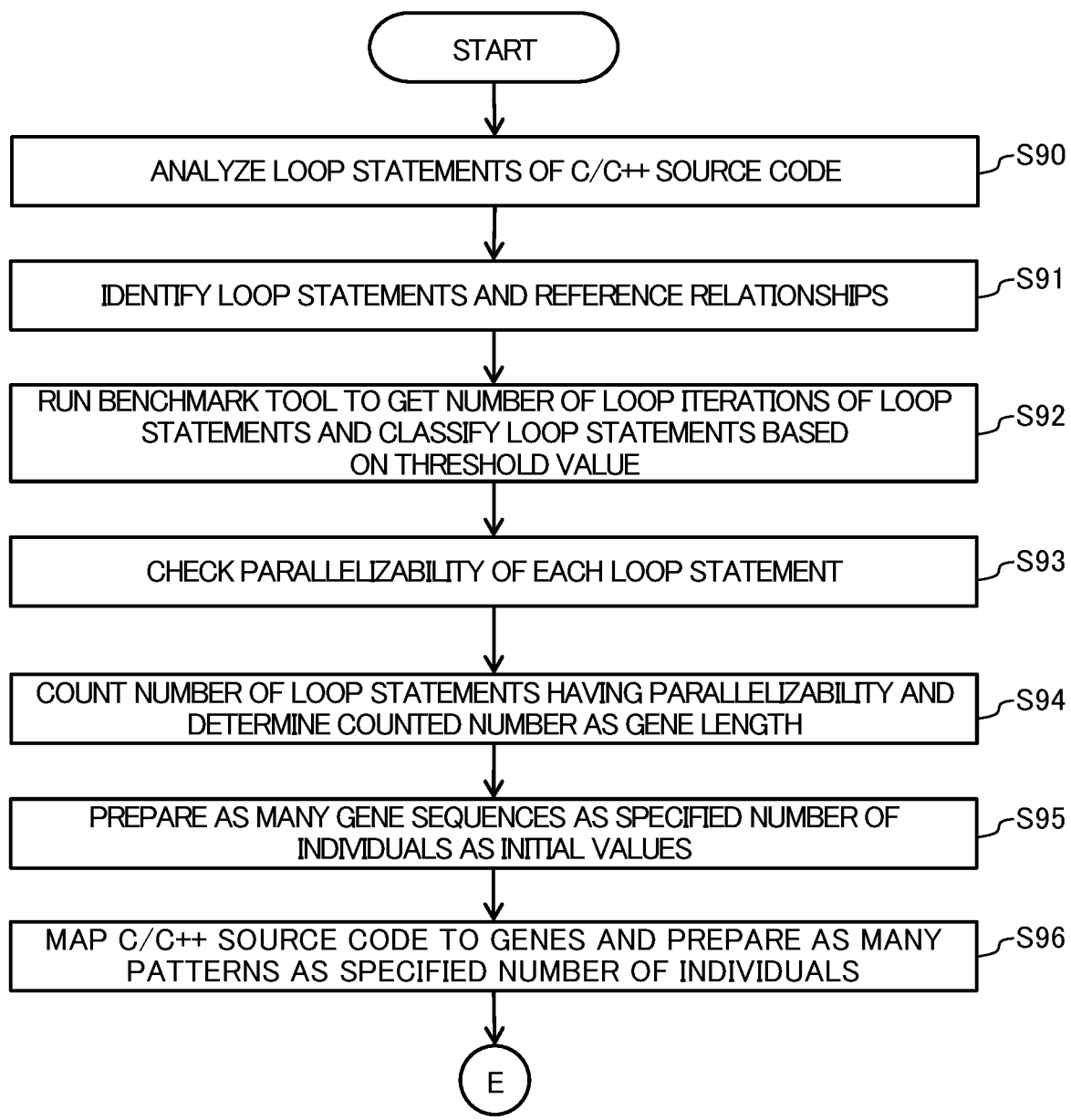
FIG. 9A is a flowchart of the selection processing of the patterns for offloading the loop statements to the many-core CPU.
Figure 9B:
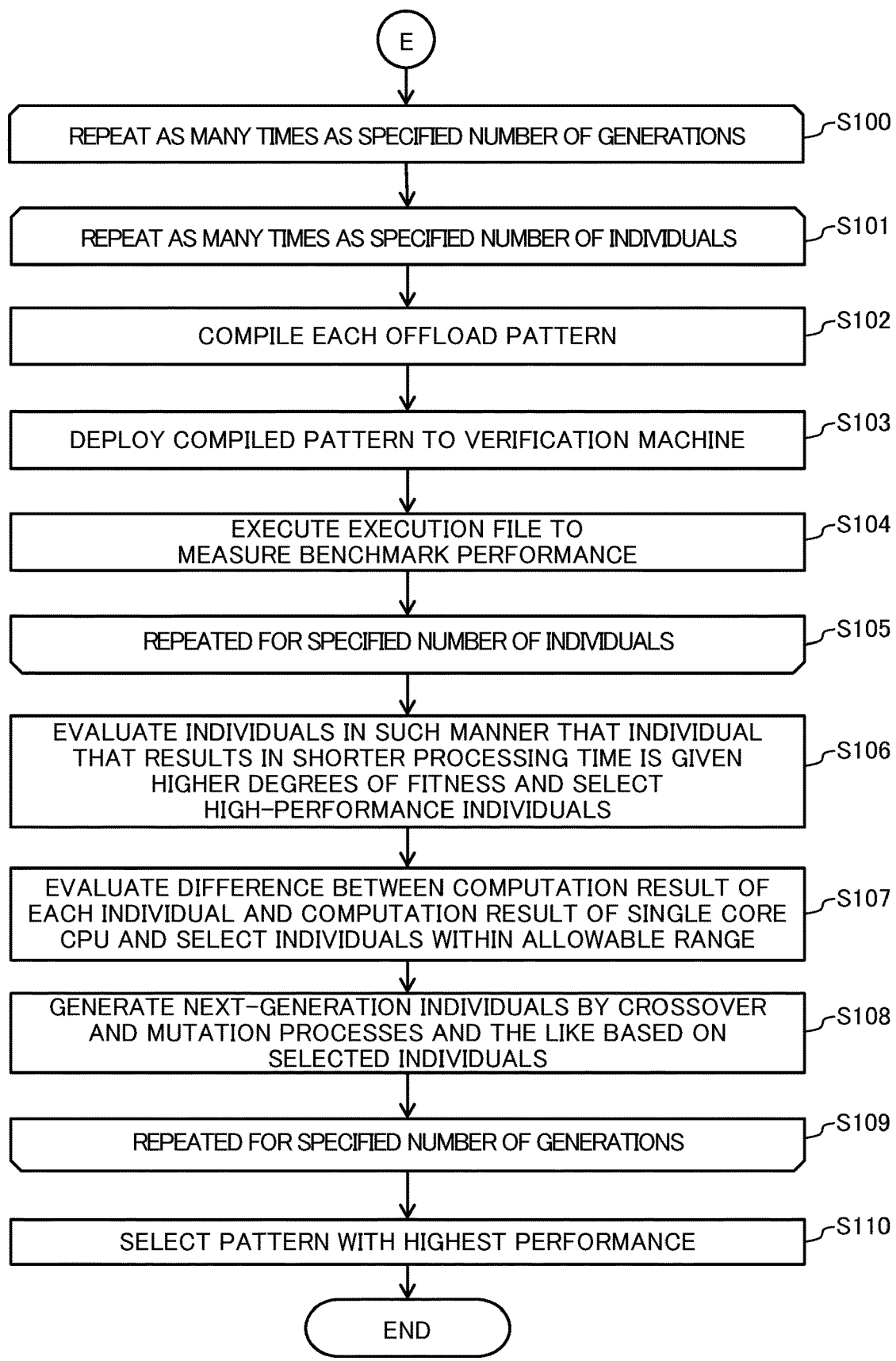
FIG. 9B is a flowchart of the selection processing of the patterns for offloading the loop statements to the many-core CPU.

In step S209, the control section 11 calls the selection processing illustrated in FIGS. 9A and 9B to check offloading of loop statements to the many-core CPU. Then, the control section 11 determines (S210) whether the desired performance is obtained. When the desired performance is obtained (Yes), the control section 11 selects (S208) a pattern with the highest performance from all the measurements, and terminates the processing of this diagram. When the desired performance is not obtained (No), the control section 11 proceeds to step S211.

Figure 11A:
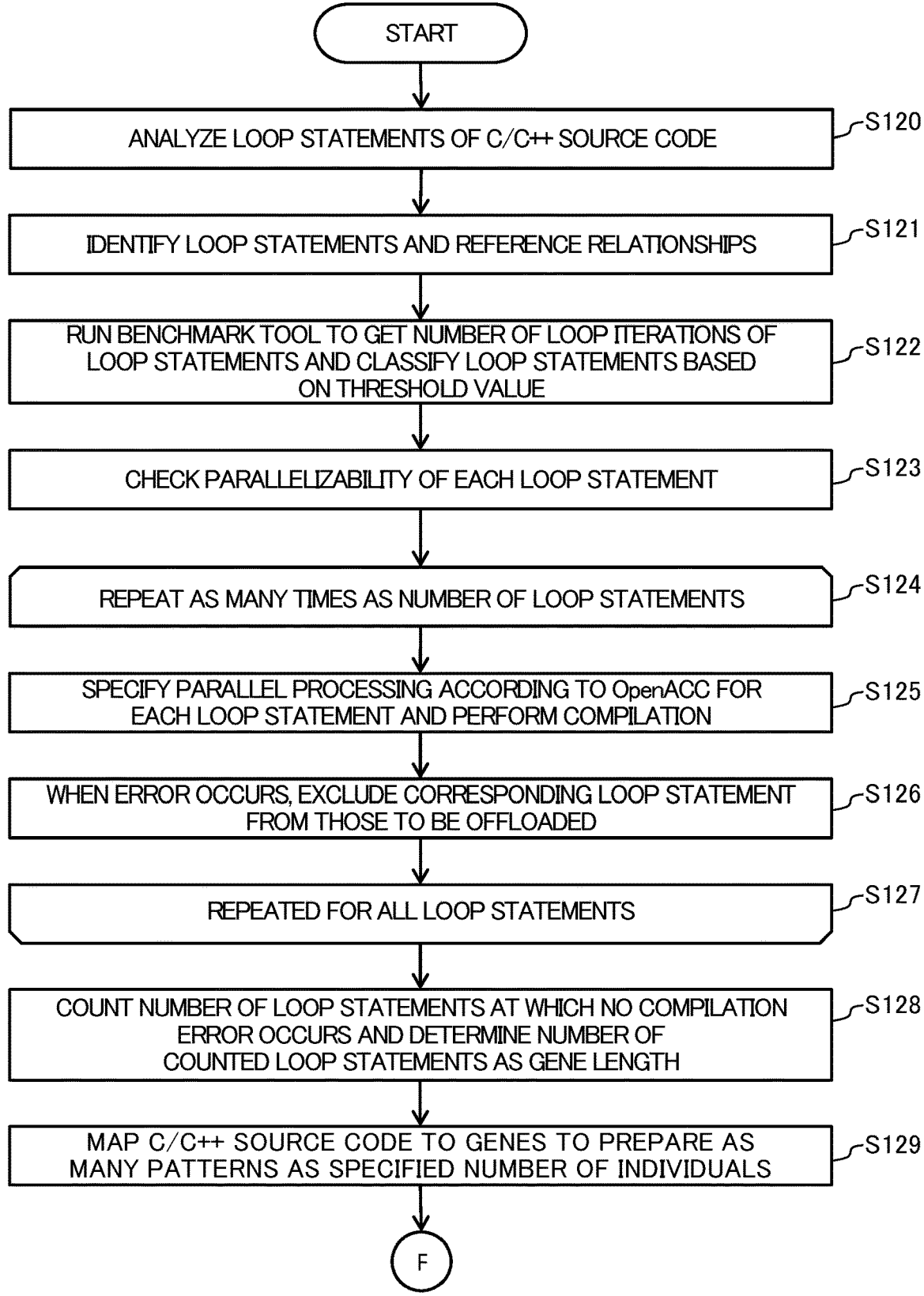
FIG. 11A is a flowchart of the selection processing of the patterns for offloading the loop statements to a GPU.
Figure 11B:
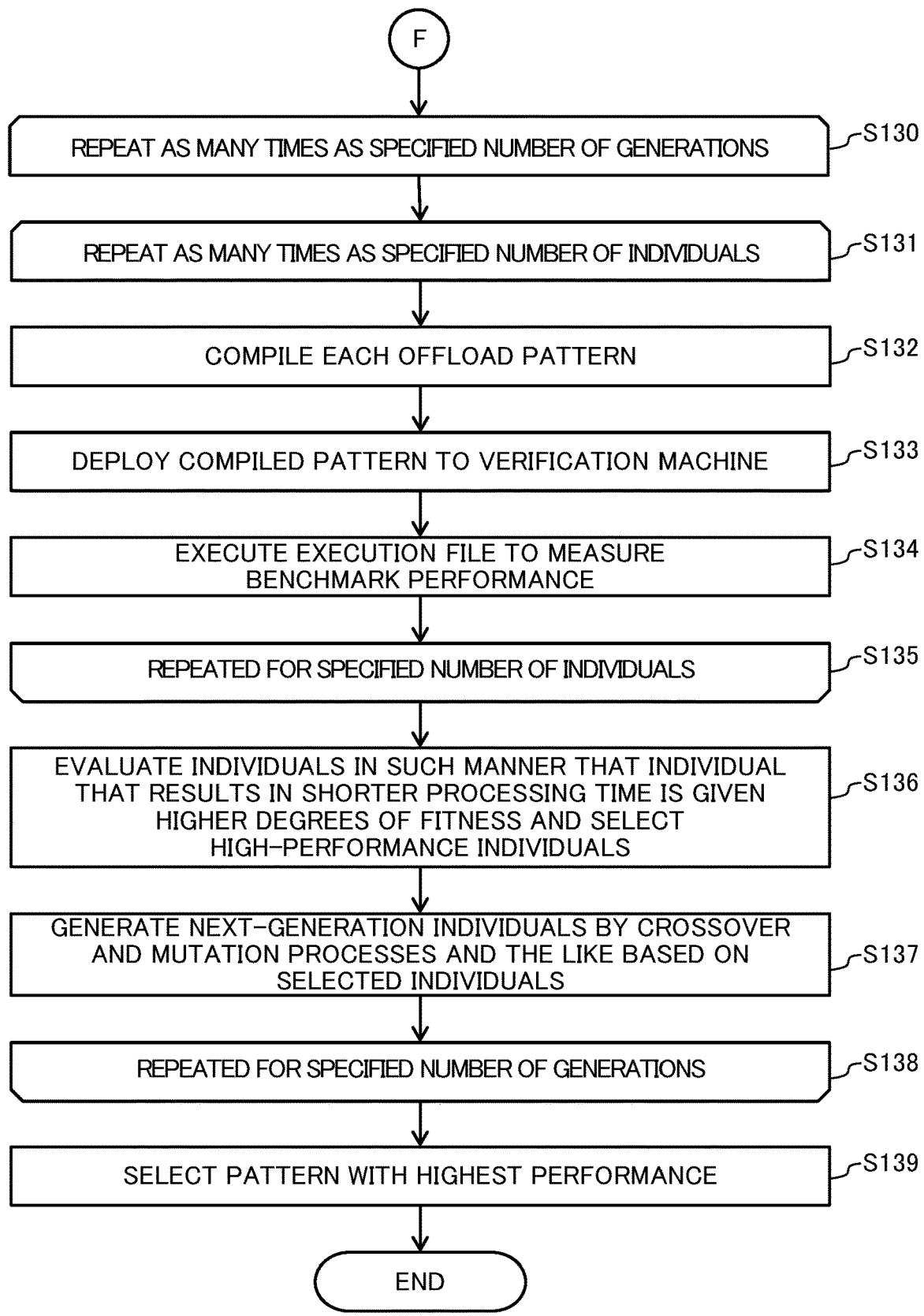
FIG. 11B is a flowchart of the selection processing of the patterns for offloading the loop statements to the GPU.

In step S211, the control section 11 calls the selection processing illustrated in FIGS. 11A and 11B to check offloading of loop statements to the GPU. Then, the control section 11 judges (S212) whether the desired performance is obtained. When the desired performance is obtained (Yes), the control section 11 selects (S208) a pattern with the highest performance from all the measurements, and terminates the processing illustrated in this diagram. When the desired performance is not obtained (No), the control section 11 proceeds to step S213.

Figure 12A:
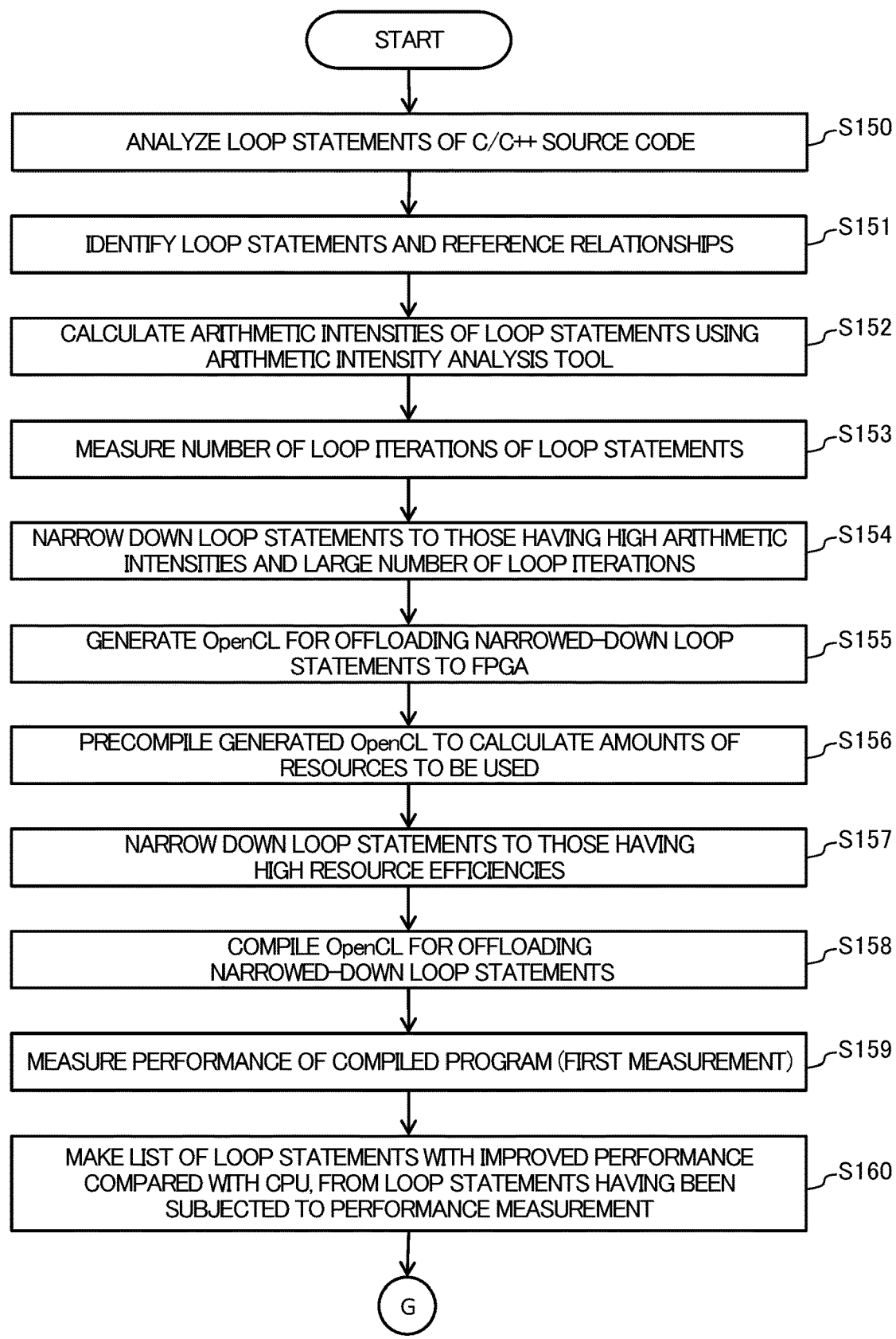
FIG. 12A is a flowchart of the selection processing of the patterns for offloading the loop statements to an FPGA.
Figure 12B:
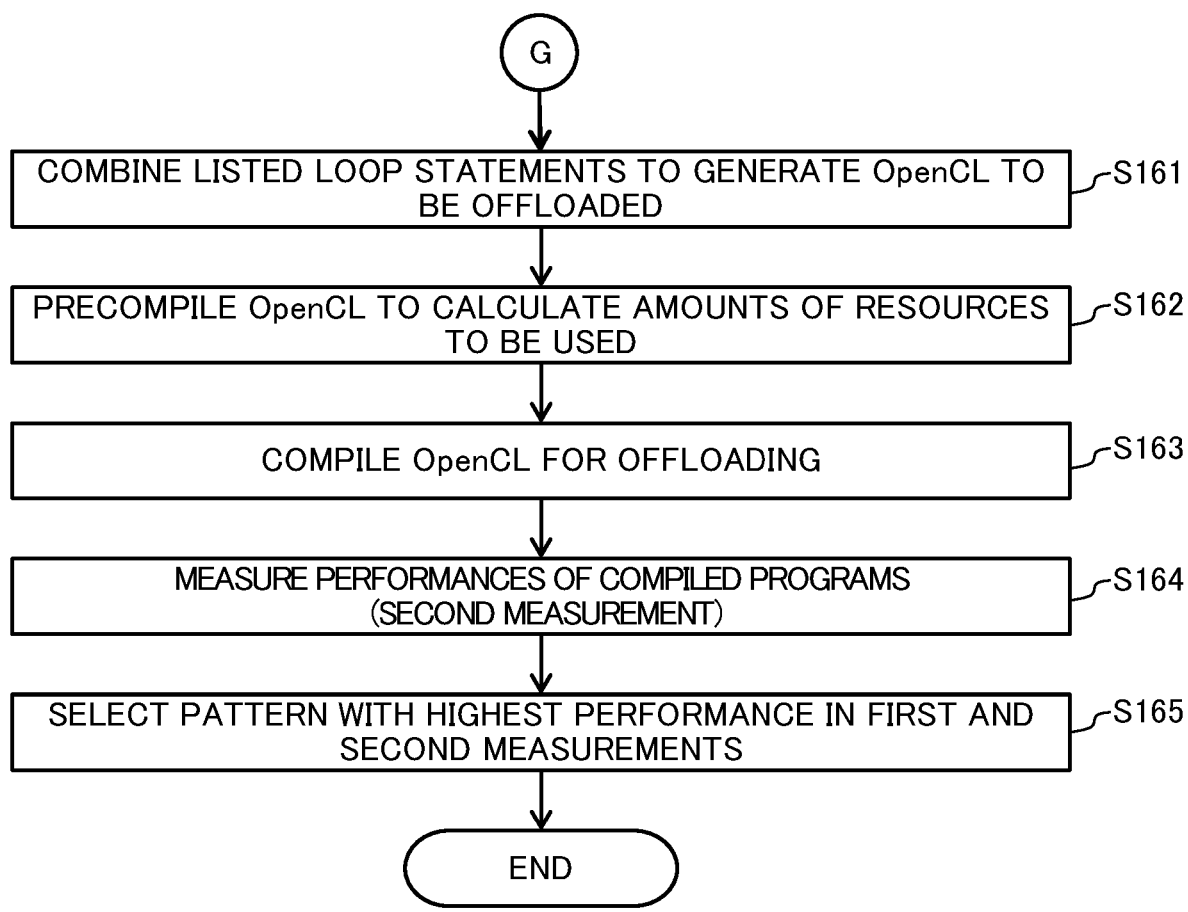
FIG. 12B is a flowchart of the selection processing of the patterns for offloading the loop statements to the FPGA.

In step S213, the control section 11 calls the selection processing illustrated in FIGS. 12A and 12B to check offloading of loop statements to the FPGA. Then, the control section 11 determines (S214) whether the desired performance is obtained. When the desired performance is obtained (Yes), the control section 11 selects (S208) a pattern with the highest performance from all the measurements, and terminates the processing illustrated in this diagram. When the desired performance is not obtained (No), the control section 11 selects (S215) a pattern with the highest performance from among the six verifications for individual migration destinations.

By the processing of steps from S209 to S215, the performance of the loop statements can be automatically improved even when an environment in which a plurality of types of accelerators coexist is the migration destination. Moreover, the control section 11 tries the many-core CPU, the GPU, and the FPGA in this order, which makes it possible to efficiently search for patterns with which acceleration is possible. The control section can efficiently search for patterns with which acceleration is possible, by trying the function blocks and then subsequently trying the loop statements, as targets to be offloaded to the accelerators.

Then, the control section 11 determines (S216) whether there are candidate(s) with which offloading to plural offload destinations in one node is possible.

When there is no candidate with which offloading to plural offload destinations in one node is possible (No), the control section 11 terminates the processing of this diagram. When there are candidate(s) with which offloading to plural offload destinations in one node is possible (Yes), the control section 11 proceeds to step S217 in FIG. 3C.

In step S217 of FIG. 3C, the control section 11 determines whether there is a candidate(s) capable of offloading a plurality of function blocks. When there is a candidate(s) capable of offloading a plurality of function blocks (Yes), the control section 11 proceeds to step S218. When there is no candidate capable of offloading a plurality of function blocks (No), the control section 11 proceeds to step S223.

In step S218, the control section 11 generates combination patterns of offloading the plurality of function blocks. The control section 11 measures (S219) the performances of the combination patterns. Then, the control section 11 determines (S220) whether acceleration is achieved by the combinations of offloading of the function blocks.

In step S220, when a faster performance is obtained by combining the offloading of the function blocks, the control section 11 removes (S221) the combined function blocks from the source code, and proceeds to the processing of step S223. When a faster performance is rather obtained by not combining the offloading of the function blocks, the control section 11 removes (S222) one function block which is best accelerated from the offload targets of the source code, and proceeds to the processing of step S223.

In step S223, the control section 11 determines whether there is a loop statement offloading pattern(s) with which acceleration is achieved and whether the acceleration is by a single accelerator or by plural accelerators. When there is no loop statement offloading pattern with which acceleration is achieved, the control section 11 proceeds to step S227 to select a pattern with the highest performance from all the measurements, and then terminates the selection processing. Here, in the case of an example in which a loop statement offloading pattern B offloads 30 for statements to a GPU and a loop statement offloading pattern C offloads 50 for statements to a many-core CPU, a case where only B can achieve acceleration is described as single accelerator, and a case where both of B and C can achieve acceleration is described as plural accelerators.

When the determination of step S223 results in loop statement offloading pattern(s) capable of acceleration with a single accelerator, the control section 11 generates (S224) combinations of offloading of the removed function blocks and offloading of the loop statements with single accelerator. Then, the control section 11 measures (S226) the performance of the combination patterns, then selects (S227) a pattern with the highest performance from all the measurements, and then terminates the selection processing.

When the determination of step S223 results in loop statement offloading pattern(s) capable of acceleration with plural accelerators, the control section 11 generates (S225) combinations of offloading of the removed function blocks and offloading of the loop statements with plural accelerators. For example, when a function block offloading A to the GPU, a loop statement offloading pattern B to the GPU, and a loop statement offloading pattern C to the many-core CPU can achieve acceleration, four combinations of A+B+C, A+B, A+C, and B+C can be considered.

Then, the control section 11 measures (S226) the performance of the combination patterns, then selects (S227) a pattern with the highest performance from all the measurements, and then terminates the selection processing.

By the processing of steps from S217 to S227, when the migration destination has a plurality of types of accelerators in the same node, offloading is performed to the plurality of types of accelerators at the same time, which makes it possible to realize faster offloading than a case of using a single accelerator.

<<Verification Order of Trial of Offloading>>

Automatic offloading at various migration destinations is considered.

As to the performance, even if the processing to be performed is the same, the performance largely changes in a manner depending on the specifications of processing hardware and the content processed (data size, number of loop iterations, etc.). Therefore, it is necessary to perform a measurement using the actual machine in the verification environment. As there are two schemes of offloading loop statements and offloading function blocks for three of the migration destination environment of GPU, FPGA, and many-core CPU, a total of 6 (=3×2) cases of offloading are considered.

First, when comparing the offloading of function blocks and the offloading of loop statements, the function block offloading that offloads the processing including the algorithm achieves more acceleration.

Next, when virtualization or the like is not performed, among GPUs, FPGAs, and many-core CPUs, in the central price range, many-core CPUs are more expensive than GPUs, and FPGAs are further more expensive than many-core CPUs. In addition, the verification time of one pattern with a many-core CPU is substantially equal to that of a GPU, and the verification time with an FPGA is longer than those of the many-core CPU and GPU. In the present situation, FPGAs require several hours for circuit setting, and thus it takes a long time for performance measurement.

In view of these current situations, a proposed order of verifications by the 6 offloading cases is as follows: offloading function blocks to a many-core CPU, offloading function blocks to a GPU, offloading function blocks to an FPGA, offloading loop statements to a many-core CPU, offloading loop statements to a GPU, and offloading loop statements to an FPGA. Offloading is performed for trial in this order to search for pattern with high-performance.

It is to be noted that the targeted code of the three of the first half may differ from the targeted code of the three of the second half. Specifically, when some function blocks are found offloadable in three of the first half, the loop statement offloading in three of the second half are tried on a code obtained by removing the function blocks which have been found offloadable.

Note that, in the trial of offloading, the user may specify the target performance and price, and when an offload pattern which is sufficiently high in speed and low in price within the range specified by the user is found in the earlier side of the six trials, the subsequent trials may be omitted. This is because, although function block offloading involves a smaller number of targets to be offloaded than that of loop statement offloading, but when offloading is possible, it is possible to for function block offloading to achieve more acceleration.

It should be noted that in the case of automatic offloading, it is desirable that high-speed patterns be searched for as inexpensively and in as short time as possible. Therefore, verification for an FPGA requiring a long verification time is to be performed at the last, and when a pattern sufficiently satisfying the user requirements has been found in a stage before the last, offload patterns for the FPGA are not verified.

Although there is no large difference in terms of price and verification time between GPUs and many-core CPUs, compared with GPUs, which have separate memory spaces and which themselves are devices different from normal CPUs, the difference of many-core CPUs from normal CPUs is small. For this reason, the verification order is such that a many-core CPU is verified first, and when a pattern sufficiently satisfying the user requirements is found with the many-core CPU, offload patterns for a GPU are not verified.

As the CPU and the GPU are different in terms of device, the computation results may be different due to a difference in rounding error or the like even if the offloading can be correctly performed.

<<Generation of a High-Performance Pattern by Combining Plural Offload Destinations>>

Trial and error are required also in generating a pattern to be adopted as the solution. When only one of the six offload trials is faster than the normal CPU, the execution file of that pattern may be deployed in the commercial environment.

Note that the selection of the pattern in deploying the execution file is not limited to selecting a pattern with the highest performance. A pattern with a high cost performance may be selected in accordance with the price of the device to be used. When acceleration has been achieved with plural cases in the verification, the pattern to be adopted as the solution must be examined.

Performing offloading to a GPU, an FPGA, and a many-core CPU of the same node for acceleration is easy. However, it is difficult to perform acceleration by offloading to a separate node because technical specifications such as MPI are required and because of communication overhead. Servers are generally configured to have a many-core CPU and a GPU, or have a many-core CPU and an FPGA, but are rarely configured to have a many-core CPU, a GPU and an FPGA.

When acceleration with a plurality of accelerators is possible, capability of offloading to the same node is set as the first condition. A many-core CPU and a GPU of the same node can be candidates, but a GPU and an FPGA of another node cannot be candidates.

First, we consider function block offloading. The following rules are used in the function block offloading. (a) When the same function block can be offloaded to a plurality of types of accelerators, an offload destination with a higher performance improvement effect is selected. (b) When different function blocks can be offloaded to different types of accelerators and cannot be offloaded to the same node, a function block with a higher performance improvement effect is set as a target to be offloaded. (c) When different function blocks can be offloaded to different types of accelerators and can be offloaded to the same node, those function blocks are set as targets to be offloaded.

As an example of rule (a), consider a case where, for FFT processing requiring 10 seconds with a single core CPU, it takes 2 seconds to offload the processing to a GPU, 1 second to offload the processing to an FPGA, and 5 seconds to offload the processing to a many-core CPU. In this case, it is preferable to select the FPGA as the accelerator of the offload destination.

As an example of rule (b), consider a case where it takes 2 seconds to offload random number processing requiring 20 seconds with a single core CPU to a GPU, it takes 1 second to offload FFT processing requiring 100 seconds with the single core CPU to an FPGA, and it takes seconds to offload matrix calculation requiring 50 seconds with the single core CPU to a many-core CPU. In this case, offloading the FFT processing to the FPGA is most effective and it is preferable to select a pattern for that offloading.

As for rule (c), the different function blocks are offloaded to the plurality of accelerators of the same node to verify the performance, and when the speed is higher than that of the offloading to a single accelerator, the offloading of the different function blocks to the plurality of accelerators of the same node is selected as the solution.

As an example of rule (c), consider a case where it takes 20 seconds to offload random number processing requiring 20 seconds with a single core CPU to a GPU, it takes 1 second to offload FFT processing requiring 10 seconds with the single core CPU to an FPGA, and it takes seconds to offload matrix calculation requiring 50 seconds with the single core CPU to a many-core CPU. Moreover, consider that there is a node in which both the GPU and the many-core CPU are equipped. In this case, it is preferable to select a pattern for offloading, on the same node, the random number processing to the GPU and the matrix calculation to the many-core CPU.

In the case of offloading to a plurality of types of accelerators on the same node, the acceleration is not always surely achieved by offloading to the plurality of types of accelerators at the same time. Therefore, the offload server 1 performs offloading to the plurality of types of accelerators at the same time to verify the performance to confirm whether more acceleration is achieved compared with a case of offloading to a single accelerator.

In this way, patterns capable of efficiently accelerating function blocks can be searched for in the environment in which a plurality of types of accelerators coexist.

It should be noted that a function block processed with a high frequency of use may be offloaded with a high priority. In this case, in the six offload verifications performed in advance, a sample test for performance measurement may be conducted in such a manner that the processing with high priority is mainly processed.

FIG. 4A is a flowchart of processing for offloading function blocks to one node.

The control section 11 of the offload server 1 determines (S50) whether the same function block can be offloaded to a plurality of types of accelerators. When the same function block can be offloaded to a plurality of types of accelerators (Yes), the control section 11 selects (S51) an offload destination having a higher performance improvement effect, and terminates the processing illustrated in FIG. 4A. When the same function block cannot be offloaded to a plurality of types of accelerators (No), the control section 11 proceeds to step S52.

In step S52, the control section 11 determines whether different function blocks can be offloaded to different types of accelerators. When different function blocks can be offloaded to different types of accelerators (Yes), the control section 11 determines (S55) these function blocks as the targets to be offloaded, and terminates the processing illustrated in FIG. 4A.

When different function blocks cannot be offloaded to different types of accelerators (No), the control section 11 determines (S54) a function block with a higher performance improvement effect as the target to be offloaded, and terminates the processing illustrated in FIG. 4A.

Next, we consider offloading of loop statements.

When function block offloading is possible, loop statement offloading is performed for the code except for the offloadable function block portions. When acceleration by loop statement offloading is by offloading to a node different from the offload destination of the function block offloading and the performance improvement effect is small, loop statement offloading is not to be performed.

As an example, when it takes 1 second to offload FFT processing requiring 100 seconds with the single core CPU to an FPGA, even if it turns out that the remaining loop statements are accelerated from 20 seconds to 5 seconds by being offloaded to a GPU, offloading to a GPU of another node is not to be performed because the performance improvement effect is small.

The following rules are used in offloading loop statements. (d) When the same loop statement can be offloaded to a plurality of types of accelerators, an offload destination with a higher performance improvement effect is selected.

(e) When different loop statements can be offloaded to different types of accelerators and cannot be offloaded to the same node, a loop statement group with a higher performance improvement effect is set as a target to be offloaded.

(f) When different loop statements can be offloaded to different types of accelerators and can be offloaded to the same node, loop statements with high performance improvement effect are offloaded with a higher priority, and the remaining loop statements which are not offloaded are offloaded to an offload destination with low performance improvement effect.

As an example of rule (d), consider a case where, for loop statements ABCDE requiring 20 seconds with a single core CPU, it takes 2 seconds when offloading the loop statements ABCDE to a GPU, it takes 1 second when offloading the loop statements ABCDE to an FPGA, and it takes 5 seconds when offloading the loop statements ABCDE to a many-core CPU. In this case, it is preferable to select a pattern for offloading the loop statements ABCDE to the FPGA.

As an example of rule (e), consider a case where: it takes 2 seconds when offloading loop statements ABC, which require 50 seconds with a single core CPU, to a GPU; it takes 1 second when offloading loops BCD, which require 100 seconds with the single core CPU, to an FPGA; and it takes 10 seconds when offloading loop statements CDE, which require 50 seconds with the single core CPU, to a many-core CPU. In this case, it is preferable to select a pattern for offloading the loop statements BCD to the FPGA.

As for rule (f), the different loops are offloaded to the plurality of accelerators of the same node to verify the performance, and when the speed is higher than that of the cases of offloading to a single accelerator, the pattern is selected as the solution. However, for a plurality of loop statements defined in the same file, restriction is placed so that the processing is not branched into another accelerator. This is to avoid an increase in complexity due to the separation of accelerators for a plurality of loop statements having deep relationships in the same file.

As an example of rule (f), consider a case where: it takes 2 seconds to offload loop statements ABC, which require 50 seconds with a single core CPU, to the GPU; it takes 1 second to offload loop statements BCD, which require 10 seconds with the single core CPU, to an FPGA; and it takes 10 second to offload loop statement CDE, which require 50 seconds with the single core CPU, to a many-core CPU, and consider that both of the GPU and the many-core CPU are equipped in the same node. In this case, a trial is performed on the same node such that loop statements ABC are offloaded to the GPU and loop statements DE are offloaded to the many-core CPU.

Figure 4B:
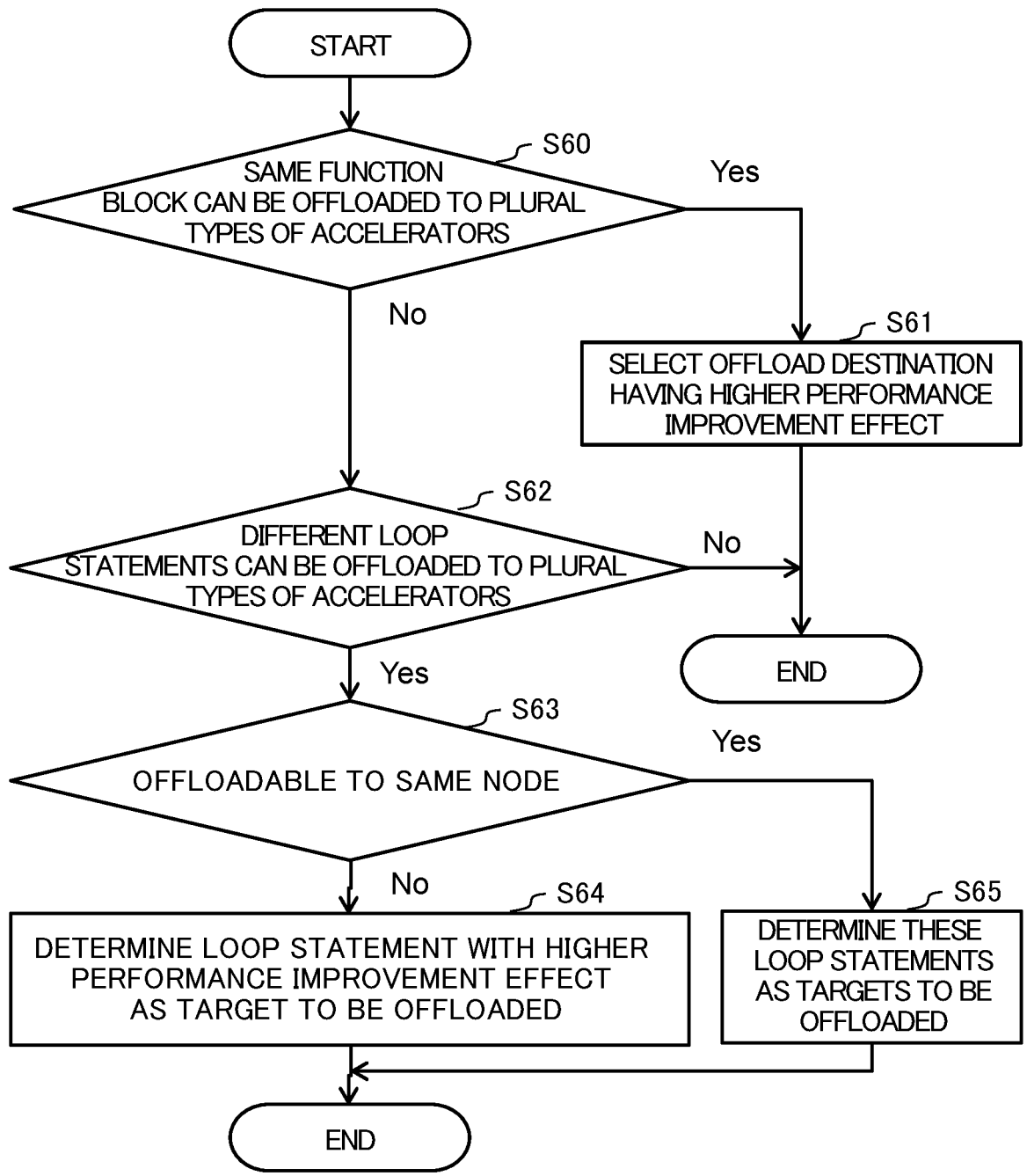
FIG. 4B is a flowchart of processing of offloading loop statements to one node.

FIG. 4B is a flowchart of processing for offloading loop statements to one node.

The control section 11 of the offload server 1 determines (S60) whether the same loop statement can be offloaded to a plurality of types of accelerators. When the same loop statement can be offloaded to a plurality of types of accelerators (Yes), the control section 11 selects (S61) an offload destination with a higher performance improvement effect and terminates the processing illustrated in FIG. 4B. When the same loop statement cannot be offloaded to a plurality of types of accelerators (No), the control section 11 proceeds to step S62.

In step S62, the control section 11 determines whether different loop statements can be offloaded to different types of accelerators. When different loop statements can be offloaded to different types of accelerators (Yes), the control section 11 determines (S65) these loop statements as targets to be offloaded and terminates the processing illustrated in FIG. 4B.

When different loop statements cannot be offloaded to different types of accelerators (No), the control section 11 determines (S64) a loop statement with a higher performance improvement effect as a target to be offloaded and terminates the processing illustrated in FIG. 4B.

In the case of offloading to a plurality of types of accelerators on the same node, as the acceleration is not always surely achieved, it is preferable to verify the performance by actual offloading to confirm whether more acceleration is achieved compared with cases of offloading to a single accelerator.

In this way, it is possible to efficiently search for a pattern with which acceleration of loop statements is achieved for the environment in which the plurality of types of accelerators coexist.

In this way, a pattern with the highest performance is to be generated based on the patterns which have achieved acceleration among the six performance measurements. Although it is possible to perform offloading to a plurality of accelerators in the same node, when combining a plurality of offload patterns, it is necessary to perform the measurement for a plurality of times in order to generate a pattern with the highest performance by measuring and confirming whether the combination results in a higher performance than the cases of offloading to a single accelerator.

FIGS. 5A and 5B are a flowchart of processing of selecting patterns for offloading function blocks to an accelerator. This selection processing uses the method of Non-Patent Literature 4.

First, the code analysis section 112 performs (S30) an offload analysis of a C/C++ source code. Specifically, the code analysis section 112 analyzes library calls and function processing included in the code using a syntax analysis tool such as Clang.

The offload area extraction section 114a detects (S31) external library calls of the source code, and retrieves (S32) accelerator libraries or accelerator IP cores usable for replacement from the code pattern database 133 using the library names as keys. Here, the accelerator is any one of a many-core CPU, a GPU, and an FPGA. Specifically, the offload area extraction section 114a retrieves, using the libraries to be called as keys, execution files, OpenCL, and the like usable for acceleration from records registered in the code pattern database 133.

The offload area extraction section 114a retrieves accelerator libraries or accelerator IP cores usable for replacement by checking the code pattern database 133 with respect to the identified external library calls using the names of the called libraries as keys. Here, the accelerator libraries are execution files for the many-core CPU and/or GPU. The accelerator IP cores are OpenCL or the like.

Note that exploring whether there is a library or an IP core for acceleration for a function block includes detecting with a similarity detection tool in addition to name matching or the like of libraries. The similarity detection tool is a tool, such as Deckard, used in software engineering for detecting copied codes and/or codes which have been modified after being copied. The similarity detection tool determines the similarity of codes by checking the abstract syntax tree similarity or the like to detect: processing whose descriptions would each be described in a similar fashion in cases their computations are to be performed on a CPU; and processing in which code of another party has been copied and modified, and the like.

The processing pattern generation section 115 replaces (S33) the processing descriptions of the replacement sources of the source code with the processing descriptions of libraries for a many-core CPU and/or GPU or the IP cores for an FPGA in a manner suitable for the accelerators of the replacement destinations. Further, the processing pattern generation section 115 offloads (S34) the processing descriptions of the accelerator libraries or accelerator IP cores used for replacement to the accelerators as function blocks to be offloaded. As it is not known whether the offloadable processing actually leads to an acceleration and whether the cost effect is sufficient, the offload processing is performed for trial through performance measurements in the verification environment to extract an offload pattern which yields higher speed.

The processing pattern generation section 115 makes (S35) descriptions of interface processing for calls to the accelerator libraries and accelerator IP cores. This interface processing is, for example, an OpenCL API for the FPGA.

Next, the execution file generation section 117 compiles (S36) the generated patterns. The performance measurement section 116 performs (S37) a performance measurement on the generated patterns in the verification environment. This is the first performance measurement.

After the first performance measurement, the execution file generation section 117 generates (S38) combination patterns using patterns that have succeeded to accelerate in the first measurement and compiles (S39) the generated combination patterns. Then, the performance measurement section 116 performs (S40) a performance measurement on the generated combination patterns in the verification environment. This is the second performance measurement.

After the second performance measurement, the actual environment deployment section 118 selects (S41) a pattern with the highest performance in the first and second measurements and terminates the processing of the flow.

As is evaluated in Non-Patent Literature 4, tuned offloading of function blocks to an accelerator which performs processing by a unit of function block including a plurality of loop statements achieves a higher degree of acceleration compared with offloading individual loop statements.

<<Implementation>>

The offload server 1 identifies program structures such as called libraries, defined classes, structures, and the like by the code analysis.

Next, the offload server 1 detects libraries for GPUs, IP cores for FPGAs, and the like capable of acceleration of the called libraries.

The offload server 1 retrieves execution files, OpenCL and the like with which acceleration is possible from the records registered in the code pattern database 133 by using the called libraries as keys. When replacement function(s) which can be accelerated are detected, the offload server 1 generates an execution file for the function(s).

In the case of a library for a many-core CPU or GPU, the original portion is deleted and replaced with a description to call a library for replacement (a CUDA library, etc.). In the case of an IP core for the FPGA, the original portion is deleted from the host code, and then the retrieved OpenCL code is described in a kernel code for replacement. After each replacement description is completed, compilation for the many-core CPU is performed with gcc, compilation for the GPU is performed with PGI compiler, and compilation for the FPGA is performed with Intel Acceleration Stack.

Description has been given for processing of calls to libraries. Note that processing for using similarity detection is to be performed in parallel. Using Deckard, the processing detects similarity between partial code of the detected classes, structures and the like and code for comparison registered in a DB to find function blocks whose similarities exceeds a threshold value and corresponding libraries for the GPU and/or corresponding IP cores for FPGA. In particular in a case where there is a difference between the code of the replacement source and the replacement library or IP core in terms of the interface, such as the arguments, return value, type, and the like, the offload server 1 inquires the user having requested offloading as to whether the interface may be modified according to the replacement destination library or IP core, and, after receipt of confirmation, generates an execution file.

Here, the offload server 1 generates an execution file capable of measuring the performance using the GPU and/or FPGA in the verification environment.

In the function block offloading, the offload server 1 confirms whether acceleration is achieved by measuring the performances of offloading and not offloading, for each replacement function block. When there is only one pattern which is faster than the normal CPU in the six trials, the offload server 1 selects that pattern, but when there are a plurality of patterns which are faster than the normal CPU, the offload server 1 generates a pattern as the solution according to the following logic.

[Automatic Offloading Operation]

The offload server 1 of the present embodiment is an example applied to a technique for automatically offloading user application logic to accelerators as elemental technology of environment adaptive software system.

Figure 6:
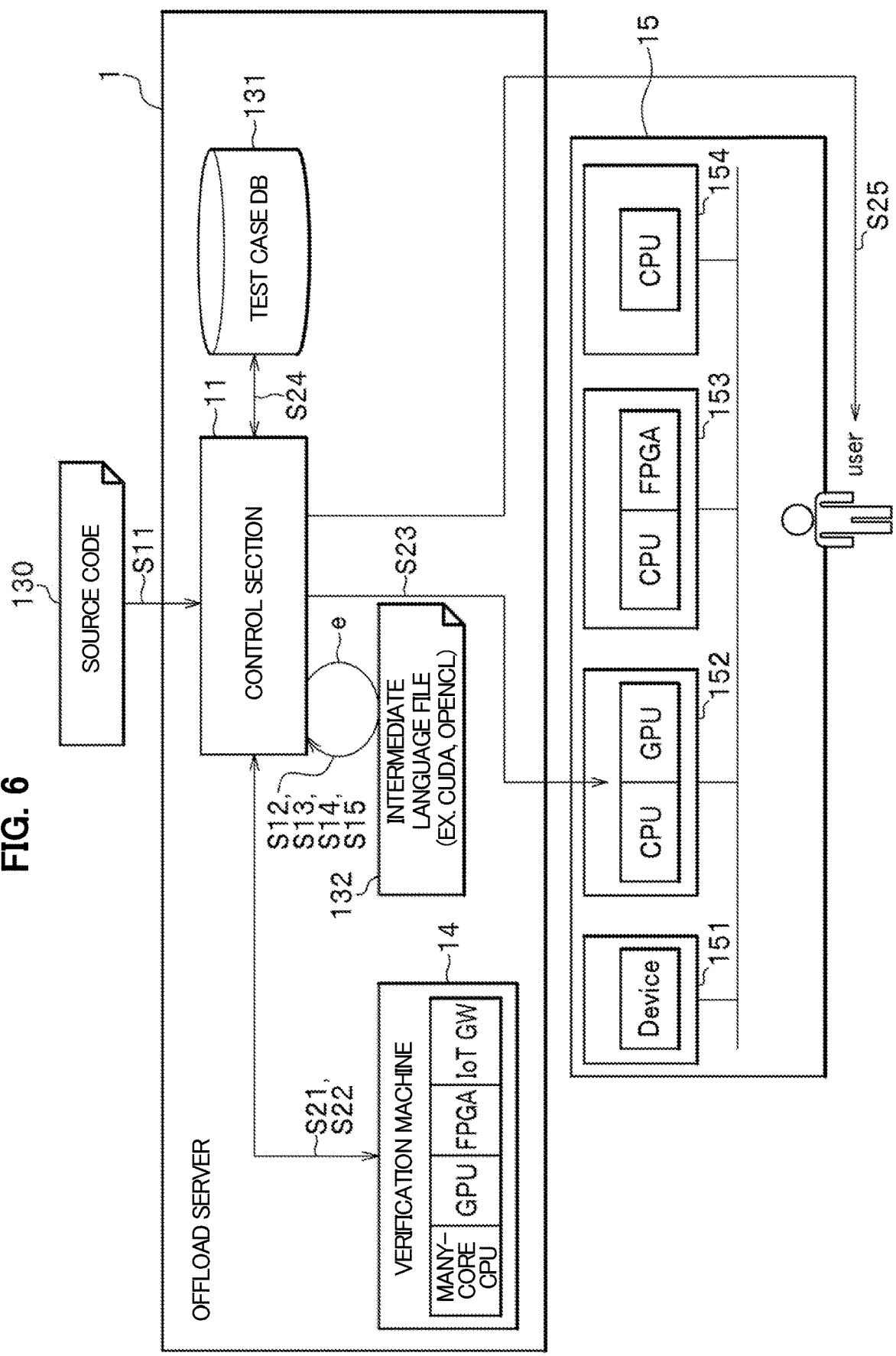
FIG. 6 is a diagram illustrating automatic offloading processes of the offload server.

FIG. 6 is a diagram illustrating an automatic offloading process of the offload server 1.

As illustrated in FIG. 6, the offload server 1 is applied to element technology of environment adaptive software system. The offload server 1 includes the control section 11, the test case database 131, the intermediate language file 132, and the verification machine 14.

The offload server 1 acquires a source code 130 to be used by the user.

The user uses resources 15. The resources 15 includes, for example, a device 151, a CPU-GPU-equipped device 152, a CPU-FPGA-equipped device 153, and a CPU-equipped device 154. The offload server 1 automatically offloads function processing to the accelerator(s) of the CPU-GPU-equipped device 152 and/or the CPU-FPGA-equipped device 153.

Hereinafter, an operation of each part will be described with reference to step numbers indicated in FIG. 6.

<<Step S11: Designation of Source Code>>

In step S11, the code designation section 111 (see FIG. 1) identifies the processing function (such as image analysis) of the service being provided to the user. Specifically, the code designation section 111 designates the inputted source code.

<<Step S12: Analysis of Source Code>>

In step S12, the code analysis section 112 (see FIG. 1) analyzes source code of the processing function, and identifies structures such as loop statements and calls to an FFT library.

<<Step S13: Extraction of Offload Area>>

In step S13, the processing designation section 114 (see FIG. 1) identifies loop statements included in the source code of the application, specifies a statement specifying application of parallel processing in the accelerator for each loop statement, and performs compilation. Specifically, the offload area extraction section 114a (see FIG. 1) extracts areas, such as loop statements and FFT, offloadable to a GPU and/or FPGA.

<<Step S14: Output of Intermediate Language File>>

In step S14, the processing designation section 114 (see FIG. 1) outputs the intermediate language file 132 by the intermediate language file output section 114b. The output of the intermediate language is not finished at one time, but is repeated for optimization through execution trials to search for appropriate offload areas.

<<Step S15: Processing when Compilation Error Occurs>>

In step S15, the processing pattern generation section 115 (see FIG. 1) excludes, from loop statements to be offloaded, any loop statement at which a compilation error occurs and generates parallel processing patterns which specify whether to perform parallel processing for the loop statements at which no compilation error occurs.

<<Step S21: Deployment of Execution Files>>

In step S21, the execution file deployment section 116a (see FIG. 1) deploys the execution file derived from the intermediate language to the verification machine 14 including a many-core CPU, a GPU and an FPGA.

<<Step S22: Performance Measurement>>

In step S22, the performance measurement section 116 (see FIG. 1) executes the deployed file to measure the performance obtained when offloading is performed.

In order to make the offload areas more appropriate, the result of the measurement of the performance is returned to the processing pattern generation section 115. Then, the processing pattern generation section 115 generates other offload patterns. Then, the performance measurement section 116 measures the performance of the other offload patterns (see reference character e in FIG. 6).

As indicated by arrow e in FIG. 6, the control section 11 repeatedly executes the processing from step S12 to step S22.

The automatic offload function of the control section 11 is summarized as follows.

The processing designation section 114 identifies loop statements of the source code, specifies a statement specifying application of parallel processing for each of the loop statements, and performs compilation. Then, the processing pattern generation section 115 excludes, from loop statements to be offloaded, any loop statement at which a compilation error occurs and generates parallel processing patterns which specify whether to perform parallel processing for the loop statements at which no compilation error occurs. Then, the performance measurement section 116 compiles the source code according to the parallel processing pattern, deploys the compilation result to the verification machine 14, and performs processing for measuring the performance in the verification machine 14. The execution file generation section 117 selects a pattern with the highest processing performance from the plurality of parallel processing patterns on the basis of a result of the performance measurement repeated for a predetermined number of times, and compiles the selected pattern to generate a an execution file.

<<Step S23: Deployment to Actual Environment>>

In step S23, the actual environment deployment section 118 determines a pattern that designates the final offload areas, and deploys the pattern to the actual environment for the user.

<<Step S24: Performance Measurement Test and Execution>>

In step S24, after the execution file is deployed, the performance measurement test extraction and execution section 119 extracts performance test items from the test case database 131, and performs an automatic execution of the extracted performance test in order to indicate the performance to the user.

<<Step S25: Provision of Price, Performance and the Like to the User>>

In step S25, the provision-to-user section 120 presents, to the user, information on the price, performance and the like based on the result of the performance test. Based on the presented information on the price, performance and the like, the user determines whether to start using the service with billing.

The above-described steps from step S11 to step S25 are performed in the background of service use of the user, and are assumed to be performed on the first day of temporary use of the service, for example.

As described above, when applied to elemental technology of the environment adaptive software system, the control section 11 of the offload server 1 extracts the areas to be offloaded from the source code of the application used by the user and outputs an intermediate language, in order to offload function processing (steps from S11 to S15). The control section 11 deploys the execution file derived from the intermediate language to the verification machine 14 and causes the verification machine 14 to execute the execution file to verify the effect of offloading (steps from S21 to S22). The control section 11 repeats the verification, then determines appropriate offload areas, and then deploys the execution file to an actual environment that is actually provided to the user, to provide the execution file as a service (steps from S23 to S25).

[Automatic Loop Statement Offloading Using Genetic Algorithm]

Automatic offloading of loop statements to a GPU and/or many-core CPU is a process of repeating the process from step S12 to step S22 in FIG. 6 to obtain offload code to be ultimately deployed in step S23.

GPUs are devices that generally do not guarantee latency but are suitable for improving throughput by parallel processing. There are a wide variety of applications suitable for a GPU. Typical applications are encryption processing of data, image processing for analysis of camera videos, machine learning processing for analysis of a large amount of sensor data and the like and they include a lot of repetitive processing. In view of this, the offload server 1 aims at performing acceleration by automatically offloading loop statements included in the source code of the application to a GPU.

In order to improve the speed, however, appropriate parallel processing is required as described in the Background Art section. When a GPU is used in particular, it is often the case that when the data size and the number of loop iterations are small, performance cannot be improved due to memory transfer between a CPU and the GPU. Further, depending on the timing or the like of memory data transfer, a combination of individual loop statements (iteration statements) that can be processed in parallel for acceleration may not result in the highest speed. For example, even if the first, fifth, and tenth loop statements among 10 loop statements (iteration statements) can achieve acceleration compared with using the CPU, the combination of the three of the first, fifth, and tenth loop statements is not necessarily be the highest speed option.

There is known an attempt of designating an appropriate parallel processing areas by determining whether loop statements are parallelizable by trial and error for optimization, by using PGI compiler. However, the trial-and-error approach requires a lot of operations and, in the event of providing the service, delays the start of the service to be used by the user and increases the cost.

In view of this, the present embodiment automatically extracts appropriate offload areas from a general program that does not assume parallelization. In order for this, the offload server 1 checks offloading of function blocks in the order of many-core CPU, GPU, and FPGA, and then checks offloading of loop statements in the order of many-core CPU, GPU, and FPGA. By checking function blocks having a high offloading effect prior to loop statements and checking function blocks in the order of many-core CPU, GPU, and FPGA, which is an order of lower verification cost, patterns capable of acceleration are efficiently searched for.

[Concept of Search by Control Section 11 Using Simple Genetic Algorithm]

Figure 7:
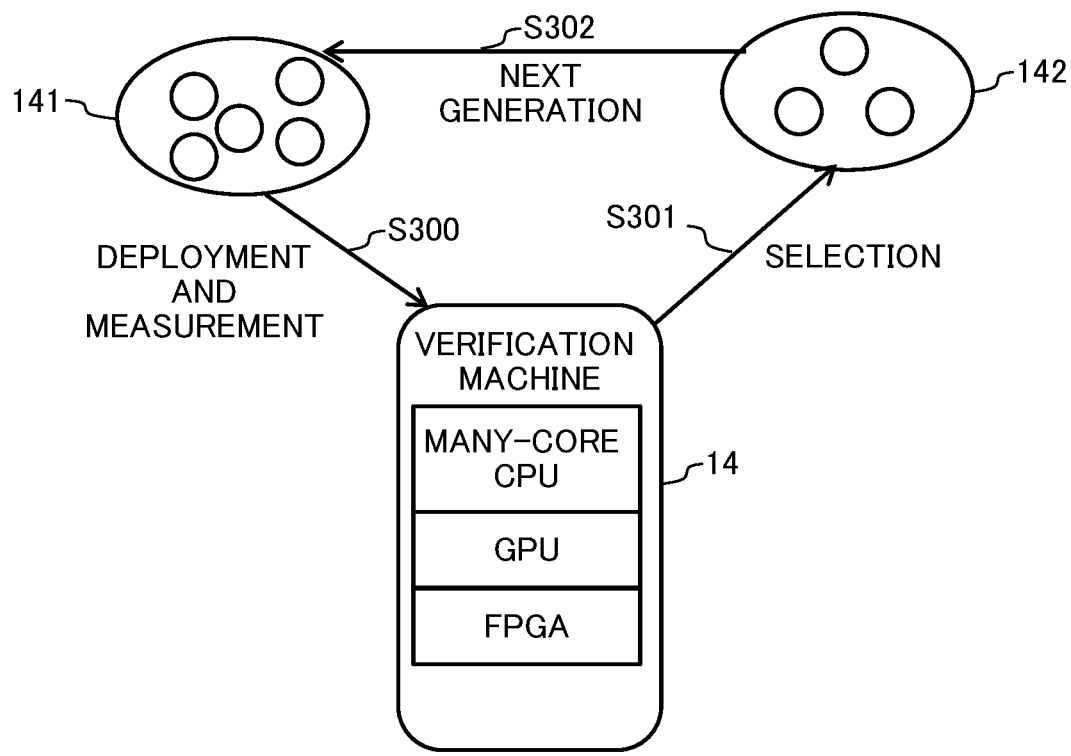
FIG. 7 is a diagram illustrating a search concept of a control section with a simple genetic algorithm of the offload server.

FIG. 7 is a diagram illustrating a concept of a search by the control section 11 using a simple genetic algorithm of the offload server.

A genetic algorithm is a combination optimization technique that mimics the evolutionary process of living organisms. The flowchart of the genetic algorithm includes initialization→evaluation→selection→crossover→mutation→termination determination.

In the present embodiment, a simple genetic algorithm, which uses simplified processing, is used among genetic algorithms. The simple genetic algorithm is a simplified genetic algorithm such that a gene consists only of 1's and 0's, roulette-wheel selection and one-point crossover are employed, and mutation is performed by flipping the value of the gene in one position from 1 to 0 or vice versa.

<<Initialization>>

In the initialization, the parallelizability of all the loop statements in the source code is checked and then the parallelizable loop statements are mapped to gene sequences. When GPU processing is to be performed, 1 is set while when GPU processing is not to be performed, 0 is set. The genes are prepared for a specified M number of individuals in such a manner that one loop statement is assigned a value of 1 or 0 randomly.

Figure 8:
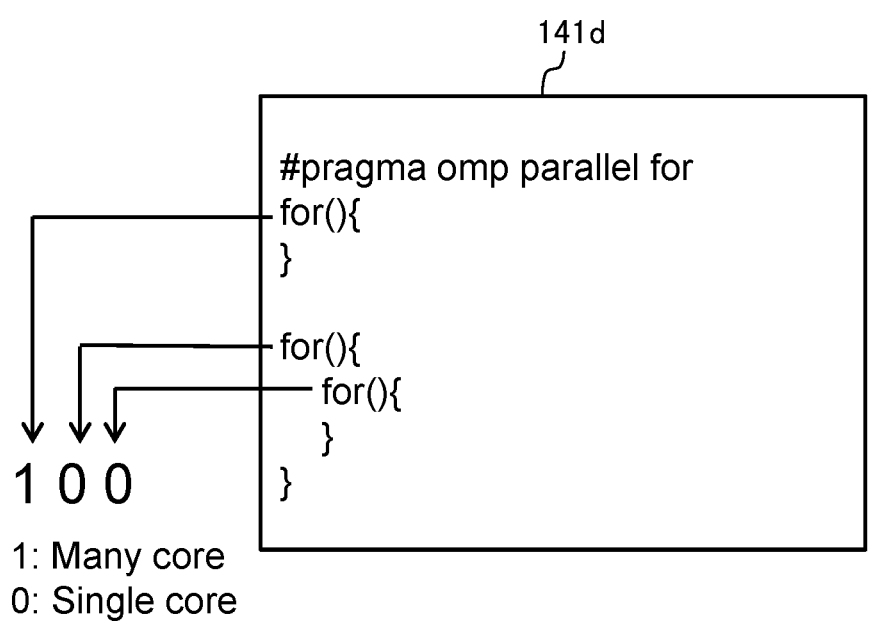
FIG. 8 is a diagram illustrating gene sequence mapping of loop statements to a many-core CPU.

Specifically, the control section 11 (see FIG. 1) retrieves the source code 130 (see FIG. 6) used by the user and checks the parallelizability of the loop statements on the basis of the code patterns 141 of the source code 130. As illustrated in FIG. 8, when three loop statements are detected in the code pattern 141d, one digit of 1 or 0 is randomly assigned to each loop statement, and here, three digits of 1 or 0 are assigned to the three loop statements. For example, the cases in which the processing is to be performed by the single CPU are assigned a value of 0, and the cases in which processing is to be outsourced to the many-core CPU are assigned a value of 1. In this stage, however, a value of 1 or 0 is randomly assigned.

Code corresponding to a gene length consists of three digits and there are 2 8=8 patterns of code with a gene length of three digits, for example: 100, 110, . . . and so on. It should be noted that circles in the code pattern 141 conceptually represent the code in FIG. 7.

<<Evaluation>>

In the evaluation in step S300, deployment and performance measurement are performed. Specifically, the performance measurement section 116 (see FIG. 1) compiles code corresponding to genes, deploys the compiled code to the verification machine 14, and executes the deployed code. The performance measurement section 116 performs a benchmark performance measurement. A gene corresponding to a pattern (parallel processing pattern) with good performance is given a higher degree of fitness.

<<Selection>>

In the selection in step S301, on the basis of the degree of fitness, high performance code patterns are selected. On the basis of the degrees of fitness, the performance measurement section 116 (see FIG. 1) selects genes with high degrees of fitness as many as a specified number of individuals. The present embodiment performs roulette-wheel selection according to the degree of fitness and elite selection of selecting the gene with the highest degree of fitness.

FIG. 7 illustrates, as the concept of the search process, that the number of circles in the selected code patterns 142 has decreased to three.

<<Crossover>>

In the crossover, some of the genes are swapped between selected individuals at one point at a certain crossover rate Pc to generate child individuals.

A gene of a certain pattern (parallel processing pattern) selected by roulette-wheel selection is crossed with a gene of another pattern. The position of the one-point crossover is arbitrary; for example, the crossover point may be the second digit in the three-digit code described above.

<<Mutation>>

In the mutation, values of a gene of an individual are changed from 0 to 1 or 1 to 0 at a certain mutation rate Pm.

Further, in order to avoid a local solution, mutation is introduced. It should be noted that, in some modes, mutation may be omitted in order to reduce the amount of computation. Then, as illustrated by step S302, the codes subjected to the crossover and mutation are used as next generation codes.

<<Termination Determination>>

Next generation code patterns after the crossover and mutation processes are generated. In the determination of termination, the process is terminated after the process is repeated a number of times equal to a specified T number of generations, and a gene with the highest degree of fitness is selected as the solution.

For example, performance measurement is performed and three individuals with high processing speed, e.g., genes 110, 010, and 001 are selected. The three patterns are recombined in the next generation using the genetic algorithm to generate a new pattern (parallel processing pattern) 011 (an example). Here, mutation is introduced into the recombined patterns by, for example, automatically replacing 0 with 1. This process is repeated to find the fastest pattern. The specified number of generations (for example, 20 generations) etc. is determined, and a pattern remaining in the final generation is selected as the final solution.

<<Deployment>>

With a parallel processing pattern having the highest processing performance corresponding to the gene with the highest degree of fitness, the deployment to the actual environment is performed anew to provide it to the user.

<<Supplemental Remarks>>

A description will be given of a case in which a considerable number of loop statements (loop statements/iteration statements) that cannot be offloaded to a GPU are present. For example, even in a case in which 200 loop statements are present, only about 30 loop statements may be offloaded to a GPU. Here, the statements that cause errors are excluded and the genetic algorithm is performed for the 30 statements.

OpenACC provides a compiler that allows specifying "#pragma acc kernels" directives to extract bytecode for GPU and to perform GPU offloading by executing the bytecode. By writing a command for a loop statement in this #pragma, it is possible to determine whether the loop statement can operate on the GPU.

In a case of using C/C++, the C/C++ code is analyzed to find loop statements. When a loop statement is found, a statement is written for the loop statement using "#pragma acc kernels", which is a syntax defined in OpenACC for parallel processing. Specifically, loop statements are inserted into an empty "#pragma acc kernels" one by one and compiled. If an error occurs for a loop statement, the loop statement cannot be processed by the GPU in the first place and thus is excluded. In this way, remaining loop statements are found. Then, the number of statements that do not cause errors are used as the length (gene length). If the number of loop statements not causing an error is 5, the gene length is 5; and if the number of loop statements not causing an error is 10, the gene length is 10. Note that one that cannot be processed in parallel is a case with a data dependency in which a previous processing is used for the next processing.

The process up to here is in the preparation stage. The genetic algorithm process is carried out next.

Up to here, code patterns with a gene length corresponding to the number of the loop statements have been obtained. Initially, parallel processing patterns, e.g., 10010, 01001, 00101, . . . , are assigned randomly. Genetic algorithm processing is performed, and compilation is performed. In this event, an error could occur even with a loop statement that is offloadable. This is the case in which the loop statement is in a hierarchy (GPU processing is possible by designating either one of the hierarchy). In such a case, the loop statement having caused the error may be retained. Specifically, it is conceivable to cause a timeout as if the timeout has been generated due to an increased processing time.

Deployment is performed on the verification machine 14 and, in the case of image processing, for example, the image processing is tested by benchmark testing and code patterns resulting in shorter processing time are evaluated as having a higher degree of fitness. For example, the evaluation is given as an inverse of the processing time. An individual which takes 10 seconds for the processing time is given a degree of fitness of 1. An individual which takes 100 seconds for the processing time is given a degree of fitness of 0.1. An individual which takes 1 second for the processing time is given a degree of fitness of 10.

The offload server 1 selects ones with a high degree of fitness. The offload server 1 selects, for example, three to five of ten individuals, and recombines them to generate new code patterns. In the course of the generating, a code pattern that is identical to a former code pattern may be generated. In such a case, as it is not necessary to perform the same benchmark, the offload server 1 uses the data of the same degree of fitness as the previous one. The offload server 1 of the present embodiment stores the code patterns and the processing times thereof in the storage section 13.

The concept of the search process by the control section 11 using simple genetic algorithm has been described above.

FIG. 8 is a diagram illustrating the gene sequence mapping of loop statements to a many-core CPU.

The code pattern 141d includes three loop statements. Here, one binary digit is assigned to each loop statement, and 1 or 0 of three digits is assigned to three loop statements at random.

A directive "#pragma omp parallel for" is given to the first for loop statement of the code pattern 141d. In this case, the first for loop statement is compiled so as to be offloaded to a many-core. Further, the gene sequence 100 of the code pattern 141d is shown on the left side of the code pattern 141d.

FIGS. 9A and 9B are flowcharts of the selection processing of the pattern for offloading loop statements to a many-core CPU.

First, the code analysis section 112 analyzes (S90) the loop statements of the C/C++ source code (S90). The processing designation section 114 identifies (S91) the loop statements and reference relationships in the C/C++ source code.

The processing designation section 114 runs (S92) a benchmark tool to get the number of loop iterations of each loop statement and classify the loop statement based on a threshold value, and checks (S93) the parallelizability of each loop statement.

PGI compiler, which is used for automatic offloading to GPU, issues an error when parallelization is impossible. However, in the case of an OpenMP compiler such as gcc, programmers are responsible for such an error. In view of this, in order to achieve automation, the processing to be performed using OpenMP directive clauses is simplified only to specify whether to perform parallel processing of loop statements on a many-core CPU and checking whether the final computation result of the parallel processing is correct is performed in the performance measurement so that only the patterns producing correct computation results are left through the evolutionary computation.

Next, the processing designation section 114 counts (S94) the number of loop statements having parallelizability and determines the number as the gene length, and prepares (S95) as many gene sequences as a specified number of individuals as initial values. Here, the processing designation section 114 generates as many gene sequences as a predetermined number of individuals to which 0 and 1 are randomly assigned.

The processing designation section 114 maps (S96) the C/C++ source code to genes, and prepares as many patterns as a specified number of individuals. Specifically, according to the prepared gene sequence, the processing designation section 114 inserts a directive that specifies parallel processing into the C/C++ code when the value of a gene is 1 (for example, see the #pragma directive in FIG. 8).

The control section 11 repeats the processing of steps from S100 to S108 as many times as a specified number of generations.

Further, in the repetitions as many times as the specified number of generations, the processes of steps from S101 to S104 are repeated as many times as the specified number of individuals. In other words, the repetitions as many times as the specified number of individuals are performed in a nested manner in the iterations as many times as the specified number of generations.

In the repetitions as many times as the specified number of individuals, the processing pattern generation section 115 (see FIG. 1) compiles (S102) the C/C++ source code in which directives are specified in accordance with the gene pattern, i.e., each offload pattern, by gcc compiler. Specifically, the processing pattern generation section 115 compiles the generated C/C++ code using a gcc compiler on a verification machine 14 equipped with a many-core CPU.

Here, a compilation error may occur for example when a plurality of nested loop statements are designated to perform parallel processing. Such a case is handled in the same way as a timeout of processing time during performance measurement.

The performance measurement section 116 (see FIG. 1) deploys (S103) the execution file obtained by compiling the offload pattern, i.e., the compiled offload pattern, to the verification machine 14 equipped with the many-core CPU, executes the deployed execution file, and measures (S104) the benchmark performance obtained when offloading is performed.

Here, the measurement is not performed on a gene in an intermediate generation that has the same pattern as a gene in a former generation and the same value is used. In other words, when a gene that has a pattern identical to a former pattern is generated in the genetic algorithm processing, the compilation and performance measurement are not performed for the individual and the same measurement value as before is used.

In step S105, the control section 11 returns to the processing of step S101 when the repetitions as many as the specified number of individuals have not been completed, and when repetitions for all the specified number of individuals is completed, the control section 11 proceeds to step S106.

Next, in step S106, the execution file generation section 117 (see FIG. 1) evaluates individuals in such a manner that an individual that results in a shorter processing time is given a higher degrees of fitness, and selects high-performance individuals.

The execution file generation section 117 (see FIG. 1) evaluates (S107) a difference between a computation result of each individual and a computation result of the single core CPU and selects individuals within an allowable range. When performing the performance measurement, the execution file generation section 117 compares the fact that the final computation result is the same as the case where parallel processing is not performed with a case where the original code is processed by the normal CPU. When the difference is too large to be acceptable, the execution file generation section 117 sets the degree of fitness of the pattern to 0 so that the patterns won't be selected for the next generation. The execution file generation section 117 checks whether the final computation result obtained when parallel processing is performed is correct at the time of performance measurement, thereby to narrow down the patterns to those with which correct computation results are obtained, through the evolutionary computation.

The execution file generation section 117 performs (S108) crossover and mutation processes on the selected individuals to generate individuals of the next generation. This is in order to perform compilation, performance measurement, setting degree of fitness, selection, crossover, and mutation on the individuals of the next generation.

Specifically, the execution file generation section 117, after completing the benchmark performance measurement for all the individuals, sets the degree of fitness of each gene sequence based on its benchmark processing time. The execution file generation section 117 selects individuals to be left based on the set degree of fitness. Then, the execution file generation section 117 performs genetic algorithm processing of crossover, mutation and faithful copy on the selected individuals to generate a group of individuals of the next generation.

In step S109, when repetitions as many as the specified number of generations have not been completed, the control section 11 returns to the processing of step S100; and when all the repetitions as many as the specified number of generations have been completed, the control section 11 proceeds to step S110.

In step S110, after finishing the genetic algorithm processing for the specified number of generations, the execution file generation section 117 determines the C/C++ code corresponding to the gene sequence with the highest performance (parallel processing pattern with the highest performance) as the solution, and terminates the processing illustrated in FIG. 9B.

In this way, even if an environment of a many-core CPU is the migration destination, it is possible to efficiently search for a pattern capable of accelerating loop statements.

Similarly to GPUs, many-core CPUs utilize many computation cores to parallelize the processing to achieve acceleration. Many-Core CPUs differ from GPUs in that, as the memory is common in the case of the many-core CPU, it is not necessary to consider the overhead due to data transfer between the memory of the CPU and the memory of the GPU, which is often problematic in the case of offloading to a GPU. In addition, for parallelization of program processing using a many-core CPU, OpenMP specification is frequently used. OpenMP is a specification such that parallel processing or the like for a program is specified by a directive clause such as "#pragma omp parallel for". It is supposed that OpenMP programmers are responsible for the processing parallelization with OpenMP. When processing which cannot be parallelized is parallelized, the compiler does not issue an error, but the computation result will be erroneously outputted.

In view of these, the present embodiment adopts an evolutionary computation technique for automatic loop statement offloading for many-core CPUs, such that parallelizability of loop statements is gradually accelerated by generating a plurality of patterns that specify "#pragma" in OpenMP and repeating an actual performance measurement in the verification environment.

<<Implementation>>

The offload server 1 analyzes the C/C++ source code to find loop statements and identify program structures such as variable data used in the loop statements and processing of the variables.

As it is necessary to exclude loop statements which cannot be processed in parallel in the first place, the offload server 1 inserts a directive for processing by a GPU for each loop statement for trial, and excludes the loop statements at which an error occurs from the targets to be subjected to the genetic algorithm. Here, the number of loop statements at which no error occurs is used as the gene length.

Next, the offload server 1 prepares as many gene sequences as the specified number of individuals as initial values. The value of each gene is prepared by randomly assigning 0 and 1. The offload server 1 inserts, according to the prepared gene sequence, directives specifying GPU processing or many-core CPU processing into the C/C++ code when the value of the gene is 1.

The offload server 1 compiles, using gcc, the C/C++ code into which the directives have been inserted, and deploys the compiled execution file to measure the performance. In the performance measurement, the offload server 1 checks, in addition to the processing time, whether there is a large difference in the computation result between the parallel processing and the processing by the original code, by using PCAST function of PGI compiler, and when the difference is not allowable, sets the degree of fitness to 0.

After measuring the performance for all the individuals, the offload server 1 sets the degree of fitness of each individual according to the processing time. Based on the set degree of fitness, individuals to be left are selected. The selected individuals are subjected to genetic algorithm processing of crossover, mutation, and faithful copy processes to generate a group of individuals of the next generation.

The offload server 1 further performs insertion of directives, compilation, performance measurement, setting degree of fitness, selection, crossover, and mutation processing on the next generation individuals, and repeats this processing as many times as the specified number of generations. After completing the genetic algorithm processing for the specified number of generations, the offload server 1 determines the C/C++ code with directives corresponding to the gene sequence with the highest performance as the solution.

Figure 10:
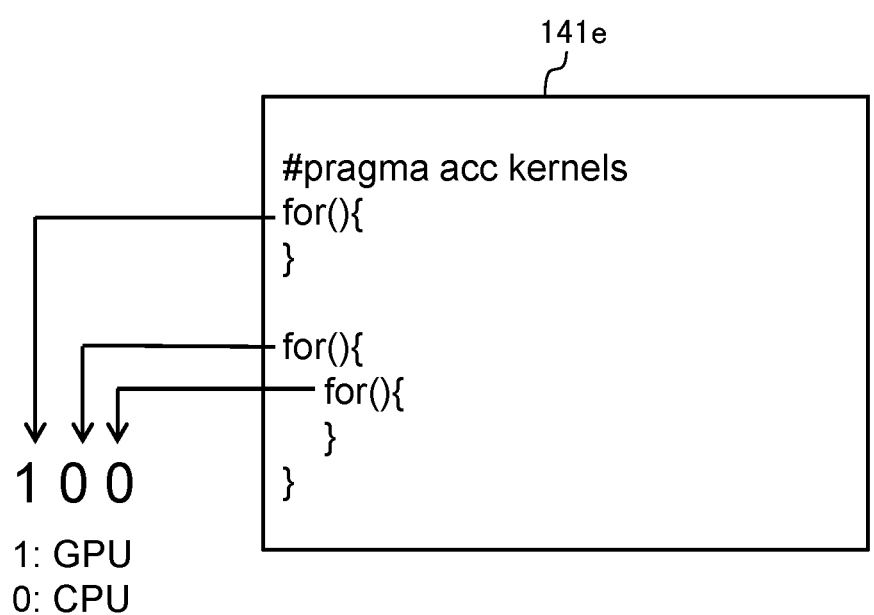
FIG. 10 is a diagram illustrating gene sequence mapping of loop statements to a GPU.

FIG. 10 is a diagram illustrating the gene sequence mapping of loop statements to a GPU.

The first for loop statement of a code pattern 141e is given a "#pragma acc kernels". In this case, the first for loop statement is compiled so as to be offloaded to the GPU. In addition, a gene sequence 100 of the code pattern 141e is shown on the left side of the code pattern 141e.

FIGS. 11A and 11B are flowcharts of processing of selecting a pattern for offloading loop statements to a GPU. This selection processing uses the method of Non-Patent Literature 2.

The offload server 1 performs the following processing by using OpenACC compiler for C/C++.

The code analysis section 112 (see FIG. 1) analyzes (S120) loop statements by code analysis of a C/C++ source code (S120). Then, the processing designation section 114 (see FIG. 1) identifies (S121) loop statements and their reference relationships in the C/C++ source code, and runs (S122) a benchmark tool to identify the number of loop iterations of each loop statement and classify the loop statements according to a threshold value. Then, the processing designation section 114 checks (S123) the parallelizability of each loop statement.

Next, the control section 11 repeats the processing of steps from S124 to S127 for the number of the loop statements.

The processing designation section 114 specifies (S125) parallel processing for each loop statement and performs compilation. As illustrated in FIG. 10, in the case of OpenACC, parallel processing is specified with "#pragma acc kernels".

When a compilation error occurs, the processing designation section 114 deletes the directive of parallel processing and excludes (S126) the loop statement from those to be offloaded. When the processing has been repeated for all the loop statements, the control section 11 proceeds to step S128.

The processing designation section 114 counts the number of loop statements at which no compilation error occurs, determines (S128) the number of the counted loop statements as the gene length, and prepares as many gene sequences as a specified number of individuals. Here, the processing designation section 114 generates as many gene sequences as the specified number of individuals to which 0 and 1 are randomly assigned as initial values. Next, the processing designation section 114 maps (S129) the C/C++ source code to genes to prepare as many patterns as the specified number of individuals. Specifically, according to the prepared gene sequence, the processing designation section 114 inserts a directive that specifies parallel processing into the C/C++ code when the value of a gene is 1 (for example, see the #pragma directive in FIG. 10).

The control section 11 repeats the processing of steps from S130 to S137 as many times as a specified number of generations.

In the repetitions of the specified number of generations, the processing of step S131 to S134 is repeated by the specified number of individuals. In other words, the repetitions as many times as the specified number of individuals are performed in a nested manner in the iterations as many times as the specified number of generations.

In the repetitions as many times as the specified number of individuals, the processing pattern generation section 115 (see FIG. 1) compiles (S132) the C/C++ source code in which directives are specified in accordance with the gene pattern, i.e., each offload pattern, by PGI compiler. Specifically, the processing pattern generation section 115 compiles the generated C/C++ code using PGI compiler on a verification machine 14 equipped with a GPU.

Here, a compilation error may occur for example when a plurality of nested loop statements are designated. Such a case is handled in the same way as a timeout of processing time during performance measurement.

The performance measurement section 116 (see FIG. 1) deploys (S133) the execution file obtained by compiling the offload pattern, i.e., the compiled offload pattern, to the verification machine 14 equipped with a CPU and the GPU, executes the deployed execution file, and measures (S134) the benchmark performance obtained when offloading is performed.

Here, the measurement is not performed on a gene in an intermediate generation that has the same pattern as a gene in a former generation and the same value is used. In other words, when a gene that has a pattern identical to a former pattern is generated in the genetic algorithm processing, the compilation and performance measurement are not performed for the individual and the same measurement value as before is used.

In step S135, the control section 11 returns to the processing of step S131 when the repetitions as many as the specified number of individuals have not been completed, and when repetitions for all the specified number of individuals have been completed, the control section 11 proceeds to step S136.

In step S136, the execution file generation section 117 (see FIG. 1) evaluates individuals in such a manner that an individual that results in a shorter processing time is given a higher degrees of fitness, and selects high-performance individuals. Then, the execution file generation section 117 performs (S137) crossover and mutation processes on the selected individuals to generate individuals of the next generation. This is in order to perform compilation, performance measurement, setting degree of fitness, selection, crossover, and mutation on the individuals of the next generation.

Specifically, the execution file generation section 117, after completing the benchmark performance measurement for all the individuals, sets the degree of fitness of each gene sequence in accordance with its benchmark processing time. Then, the execution file generation section 117 selects individuals to be left in accordance with the set degree of fitness. Then, the execution file generation section 117 performs genetic algorithm processing of crossover, mutation and faithful copy on the selected individuals to generate a group of individuals of the next generation.

In step S138, when repetitions as many as the specified number of generations have not been completed, the control section 11 returns to the processing of step S130; and when all the repetitions as many as the specified number of generations have been completed, the control section 11 proceeds to step S139.

After finishing the genetic algorithm processing for the specified number of generations, in step S139, the execution file generation section 117 determines C/C++ code corresponding to the gene sequence with the highest performance (parallel processing pattern with the highest performance) as the solution, and terminates the processing illustrated in FIG. 11B.

As a basic problem, although it is possible for a compiler to find a restriction that a certain loop statement cannot be processed in parallel with a GPU, it is difficult to find whether the loop statement is suitable for parallel processing of the GPU.

In general, it is said that a loop or the like having a larger number of loop iterations is more suitable for GPU offloading. However, it is difficult to predict how much performance can be actually achieved by offloading to the GPU without actual measurement. For these reasons, conventionally, instructions for offloading loops to a GPU are manually provided and performance measurement is performed in a trial and error fashion.

Non-Patent Literature 2 proposes to automatically find out appropriate loop statements to be offloaded to a GPU by a genetic algorithm which is one of evolutionary computation techniques. The proposal proposes to: first check a general program, which is not intended to be processed with a GPU, for parallelizable loop statements; then represent the parallelizable loop statements as genes by assigning a value of 1 to each loop statement to be executed on a GPU and assigning a value of 0 to each loop statement to be executed on a CPU; and then repeat a performance verification in a verification environment to search for appropriate areas.

By narrowing down to parallelizable loop statements and retaining and recombining accelerable parallel processing patterns in the form of portions of genes, a pattern that can be efficiently accelerated can be searched for from among a huge number of possible parallel processing patterns.

Regarding variables used in nested loop statements in a case of offloading loop statements to a GPU, Non-Patent Literature 2 proposes, in addition to performing proper extraction of loop statements, that variables that can be transferred between a CPU and the GPU at a high nesting level without problem be collectively transferred at the high nesting level, because when a transfer is performed between the CPU and the GPU at a low nesting level, transfer is performed in each iteration of the low-level loop, which decreases the efficiency.

Regarding the automatic GPU offloading of loop statements, the automatic offloading is made possible by optimization using an evolutionary computation technique and reduction of CPU-GPU transfers.

FIGS. 12A and 12B are flowcharts of processing of selecting a pattern for offloading loop statements to an FPGA. This selection processing uses the method of Non-Patent Literature 3.

First, the code analysis section 112 analyzes the source code to be offloaded (S150) to analyze information on loop statements and variables according to the language of the source code.

Then, the offload area extraction section 114a identifies (S151) loop statements and reference relationships in the source code (S151) to narrow down the identified loop statements to candidates for which FPGA offloading is to be carried out for trial. Arithmetic intensity is one index on which to base the determination as to whether offloading of the loop statements is effective or not.

The offload area extraction section 114a calculates (S152) the arithmetic intensities of the loop statements in the application using an arithmetic intensity analysis tool. Arithmetic intensity is an index that increases as the number of calculations increases and decreases as the number of accesses increases. Processing with high arithmetic intensity places a heavy processing load on the processor. In view of this, the offload area extraction section 114a analyzes the arithmetic intensities of the loop statements using the arithmetic intensity analysis tool, and narrows down the loop statements to those with high arithmetic intensities as candidates to be offloaded.

Loop statements with high arithmetic intensities may pose a problem if they excessively consume FPGA resources when being processed on the FPGA. A description will be given of calculation of the amount of resources used when loop statements with high arithmetic intensities are processed on an FPGA.

The processing when compilation for an FPGA is to be carried out is such that a high-level language such as OpenCL is translated to a level such as HDL, which is a hardware description language and on the basis of which actual wiring processing and the like are performed. Whereas it takes a significant time to perform the wiring or the like, it takes only a time of the order of minutes up to the stage of an intermediate state such as HDL. Even in the stage of an intermediate state such as HDL, resources such as flip-flops and look-up tables to be used in the FPGA are identified. Therefore, the amount of resources to be used can be determined in a short time before the completion of the compilation by checking the stage of an intermediate state such as HDL.

In view of this, the processing pattern generation section 115 of the present embodiment translates the loop statements of interest into a high-level language such as OpenCL and calculates the amounts of the resources first. In addition, as the arithmetic intensity and the amount of resources when the loop statement is offloaded are determined, a resource efficiency is determined as [arithmetic intensity]/[amount of resources] or [arithmetic intensity]×[number of loop iterations]/[amount of resources]. Then, the loop statements are further narrowed down to, as candidates to be offloaded, those having a high resource efficiency.

Returning to the flow of FIG. 12A, the description will be continued. The processing pattern generation section 115 measures (S153) the number of loop iterations of the loop statements in the application using a profiling tool such as gcov or gprof, and narrows down (S154) the loop statements to those having a high arithmetic intensity and a large number of loop iterations.

The processing pattern generation section 115 generates (S155) OpenCL for offloading the narrowed-down loop statements to the FPGA.

Translation of a loop statement according to OpenCL will now be described in further detail. Two processes are required for translating a loop statement into a high-level language by, for example, OpenCL. One is a process to separate the CPU processing program into a kernel (FPGA) and a host (CPU) in accordance with the grammar of a high-level language such as OpenCL. The other is to use an acceleration technique when performing the separation. In general, techniques for acceleration using an FPGA include local memory caching, stream processing, multiple instantiation, unroll processing of loop statements, integration of nested loop statements, memory interleaving and the like. These techniques are not necessarily effective for some loop statements but are often used as methods for acceleration.

Now, several loop statements with high resource efficiencies have been selected. Then, offload patterns as many as the number of performance measurements to be performed are generated using the selected loop statements. Regarding the acceleration by an FPGA, there is a case where acceleration is performed by applying an amount of FPGA resources only to one process in a concentrated manner, and there is even another case where acceleration is performed by distributing the FPGA resources to a plurality of processes. The offload server 1 generates a certain number of patterns of selected single loop statements and precompiles them as a preparation stage before operating on the actual machine equipped with an FPGA.

The processing pattern generation section 115 precompiles (S156) the generated OpenCL to calculate the amounts of the resources to be used, and narrows down (S157) the loop statements to those having a high resource efficiency.

Then, the execution file generation section 117 compiles (S158) OpenCL for offloading the narrowed-down loop statements. The performance measurement section 116 measures (S159) the performance of the compiled program. This is the first performance measurement.

The processing pattern generation section 115 makes (S160) a list of loop statements with improved performance compared with when executed on the CPU, from the loop statements having been subjected to the performance measurement, and combines (S161) the listed loop statements to generate OpenCL to be offloaded. The processing pattern generation section 115 precompiles (S162) the combined offloading OpenCL to calculate the amounts of resources to be used. This is the second resource amount calculation. Note that the processing pattern generation section 115 may use the sum of the resource amounts obtained according to the precompilation before the first measurement without performing precompilation. This can reduce the number of times of the precompilation.

The execution file generation section 117 compiles (S163) the combined OpenCL for offloading. The performance measurement section 116 measures (S164) the performances of the compiled programs. This is the second performance measurement.

The actual environment deployment section 118 selects (S165) a pattern with the highest performance among the first and second measurements, and terminates the processing of the present flow.

In this way, the automatic offloading of loop statements to the FPGA narrows down the loop statements to those having a high arithmetic intensity, a large number of loop iterations, and high resource efficiency in order to generate offload patterns, and then searches for a high-speed pattern through measurement in a verification environment.

Considering acceleration by offloading certain loop statements requiring long processing time to an FPGA, it is difficult to predict whether acceleration is achieved by selecting which loop statement. Therefore, we propose performing performance measurement automatically in the verification environment in a manner similar to the case for the GPU. However, in the case of an FPGA, it takes several hours or more to compile an OpenCL and allow the compilation result to run on an actual machine, and therefore, it is impractical to perform repetitive measurements of the performance many times using the genetic algorithm used for the GPU automatic offloading because the processing time is huge.

In view of this, the present embodiment adopts a scheme of narrowing down the candidate loop statements to be offloaded to the FPGA and then performing the performance measurement trial. Specifically, first, the embodiment extracts loop statements with high arithmetic intensities from the found loop statements by using an arithmetic intensity analysis tool such as ROSE framework. Further, the embodiment also extracts loop statements with a large number of loop iterations by using a profiling tool such as gcov and gprof.

Then, loop statements having large arithmetic intensities and having a large number of loop iterations are selected as candidates and translated according to OpenCL. The generated OpenCL is precompiled with respect to the offload candidate loop statements loop statements having large arithmetic intensities and having a large number of loop iterations to find loop statements with high resource efficiencies. As resources such as flip-flops and look-up tables to be generated are identified in the middle of compilation, the loop statements are further narrowed down to those having a small amount of resources to be used.

Now, as several loop statements have been selected, actual performances are measured using them. Regarding the acceleration by an FPGA, there is a case where acceleration is performed by applying an amount of FPGA resources only to one process in a concentrated manner, and there is even another case where acceleration is performed by distributing the FPGA resources to a plurality of processes. Then, the selected single loop statements are compiled so as to operate on the actual machine equipped with an FPGA and their performances are measured. Further, for the single loop statements for which acceleration has been achieved, patterns for combining them are generated and the second performance measurement is performed.

The offload server 1 selects a pattern with the highest speed as the solution among the plurality of patterns whose performance is measured in the verification environment.

Regarding the automatic FPGA offloading of loop statements, automatic offloading is made possible by narrowing down candidate loop statements using the arithmetic intensities, the number of loop iterations, and the amount of resources and performing a performance measurement for a plurality of patterns in the verification environment.

<<Implementation>>

The offload server 1 analyzes the C/C++ source code to find loop statements and identify program structures such as variable data used in the loop statements.

Next, the offload server 1 executes ROSE to acquires the arithmetic intensity of each loop statement, and acquires the number of loop iterations of each loop statement by using gcov.

Next, the offload server 1 generates OpenCL code for offloading individual loop statement having a high arithmetic intensity and having a large number of loop iterations to an FPGA. The OpenCL code separates the loop statement as an FPGA kernel and the rest as a CPU host program.

Next, the offload server 1 precompiles the generated OpenCL code to calculate the amounts of resources such as flip-flops to be used. The amounts of resources to be used are indicated as the proportions to the total amount of resources. Here, the offload server 1 selects, based on the arithmetic intensities, the number of loop iterations and the amount of resources, loop statements having high arithmetic intensities and having a large number of loop iterations and requiring a low resource amount (loop statements with high resource efficiencies).

Next, the offload server 1 generates patterns to be actually measured with the selected loop statements being as candidates and compiles them. The offload server 1 confirms, for each of the selected loop statements, whether acceleration is achieved by offloading the loop statement and measuring the performance. As a result, when a plurality of loop statements can be accelerated, the offload server 1 generates OpenCL of combinations of them, measures the performances, and confirms whether more acceleration than single offloading is possible. However, as FPGAs has limitations in the amount of resources, the offload server 1 does not generates the OpenCL when the amount of resources does not fall within the upper limit value in offloading the plurality of loop statements.

Finally, the offload server 1 selects a high-speed pattern as the solution from the plurality of measurement patterns.

<<Effects of Present Invention>>

A first aspect of this disclosure is an offload server including: one or more hardware processors; a code analysis section, implemented using one or more of the one or more hardware processors, configured to analyze whether a source code of a software program includes at least one function block executable by at least one accelerator; a processing pattern generation section, implemented using one or more of the one or more hardware processors, configured to generate a first plurality of patterns for offloading the at least one function block to the at least one accelerator; a performance measurement section, implemented using one or more of the one or more hardware processors, configured to deploy each of the first plurality of patterns for offloading the at least one function block to a verification environment to measure a first performance; and a control section, implemented using one or more of the one or more hardware processors, configured to, when the first performance measured by the performance measurement section satisfies a desired level, generate a second plurality of patterns for offloading at least one remaining loop statement except the at least one function block in the software program by the processing pattern generation section, and deploy each of the second plurality of patterns to the verification environment to measure a second performance by the performance measurement section, and when the first performance measured by the performance measurement section fails to satisfy the desired level, generate a third plurality of patterns for offloading at least one loop statement of the software program by the processing pattern generation section, and deploy each of the third plurality of patterns to the verification environment to measure a third performance by the performance measurement section.

With this configuration, the performance can be automatically improved even when an environment where a plurality of types of accelerators coexist is the migration destination. Moreover, when the migration destination has the plurality of types of accelerators on the same node, offloading is performed at the same time to the plurality of types of accelerators, thereby achieving faster offloading than in the case of using a single accelerator.

A second aspect of this disclosure is the offload server according to the first aspect, wherein the at least one accelerator is constituted of a plurality of types of accelerators, and wherein the control section is further configured to select, from each of the first plurality of patterns, the second plurality of patterns, and the third plurality of patterns, a pattern with a highest speed.

With this configuration, the performance can be automatically improved even when an environment where a plurality of types of accelerators coexist is the migration destination.

A third aspect of this disclosure is the offload server according to the aspect 1 or 2, wherein the control section is further configured to try the at least one function block and then try the at least one remaining loop statement or the at least one loop statement, as a target to be offloaded to the accelerator, and wherein the control section is further configured to try a many-core CPU, a GPU, and an FPGA in this order as the accelerator to which the at least one function block, the at least one remaining loop statement, and/or the at least one loop statement is offloaded.

With this configuration, it is possible to efficiently search for a pattern with which acceleration is achieved for the environment in which the plurality of types of accelerators coexist.

A fourth aspect of the present disclosure is the offload server according to the second aspect, wherein the at least one accelerator is a plurality of accelerators, wherein the at least one function block is a plurality of function blocks, wherein the at least one remaining loop statement for which the second performance is measured or the at least one loop statement for which the third performance is measured is a plurality of performance-measured loop statements, wherein the control section is further configured to, regarding offloading of the plurality of function blocks or the plurality of performance-measured loop statements: when a pattern faster than original processing is found for plural ones of the plurality of accelerators and a same function block or a same loop statement can be offloaded to the plural ones of the plurality of accelerators, select an accelerator providing higher performance as an offload destination among the plural ones of the plurality of accelerators; when first different function blocks among the plurality of function blocks or first different loop statements among the plurality of performance-measured loop statements can be offloaded to first different accelerators among the plurality of accelerators and cannot be offloaded to the first different accelerators of a same node, select an accelerator providing higher performance as an offload destination among the first different accelerators; and when second different function blocks among the plurality of function blocks or second different loop statements among the plurality of performance-measured loop statements can be offloaded to second different accelerators among the plurality of accelerators and can be offloaded to the second different accelerators of a same node, select the second different accelerators of the same node as offload destinations of the second different blocks or the second different loop statements.

With this configuration, it is possible to search for a pattern capable of efficiently accelerating the function blocks or the loop statements in the environment in which the plurality of types of accelerators coexist.

A fifth aspect of the present disclosure is the offload server according to the first aspect, wherein the at least one remaining loop statement for which the second performance is measured or the at least one loop statement for which the third performance is measured is at least one performance-measured loop statement, wherein the control section is further configured to, regarding offloading of the at least one function block and the at least one performance-measured loop statement: when an offload destination of the at least one performance-measured loop statement is a node different from an offload destination of the at least one function block, try a pattern for offloading the at least one function block and not try a pattern for offloading the at least one performance-measured loop statement when a first performance improvement by offloading the at least one performance-measured loop statement is less than or equal to a second performance improvement by offloading the at least one function block, and try a pattern for offloading the at least one performance-measured loop statement and not try a pattern for offloading the at least one function block when the first performance improvement exceeds the second performance improvement; and when the offload destination of the at least one performance-measured loop statement is a same node as the offload destination of the at least one function block, try a pattern for offloading the at least one function block and the at least one performance-measured loop statement.

With this configuration, it is possible to search for a pattern capable of efficiently accelerating the function blocks or the loop statements in the environment in which a plurality of types of accelerators coexist.

A sixth aspect of this disclosure is an offload server including: one or more hardware processors; a code analysis section, implemented using one or more of the one or more hardware processors, configured to analyze whether a source code of a software program includes at least one loop statement executable by a many-core CPU; a processing pattern generation section, implemented using one or more of the one or more hardware processors, configured to generate patterns for offloading the at least one loop statement to the many-core CPU; and a performance measurement section, implemented using one or more of the one or more hardware processors, configured to repeat processing comprising mapping the at least one loop statement to gene patterns, deploying each of the gene patterns, each of which is for offloading the at least one loop statement, to a verification environment to measure a performance, setting, as a degree of fitness, a higher value to a gene pattern with a higher performance, and generating next-generation patterns by performing processing of elite selection, crossover, and mutation of a genetic algorithm, wherein the performance measurement section is further configured to, in the performance measurement on the verification environment: compare a computation result obtained when processed by the many-core CPU with a computation result of an original processing; and when an error of the computation result obtained when processed by the many-core CPU exceeds an allowable threshold value, set a low value as the degree of fitness of the corresponding gene pattern.

With this configuration, even if an environment of a many-core CPU is the migration destination, it is possible to search for a pattern capable of efficiently accelerating loop statements.

A seventh aspect of this disclosure is an offload control method for a computer comprising one or more hardware processors, the offload control method including steps of: analyzing, by a code analysis section implemented using one or more of the one or more hardware processors, whether a source code of a software program includes at least one function block executable by an accelerator; generating, by a processing pattern generation section implemented using one or more of the one or more hardware processors, a first plurality of patterns for offloading the at least one function block to the accelerator; deploying, by a performance measurement section implemented using one or more of the one or more hardware processors, each of the first plurality of patterns for offloading the at least one function block to a verification environment to measure a first performance; when the first performance measured by the performance measurement section satisfies a desired level, generating, by the processing pattern generation section, a second plurality of patterns for offloading at least one remaining loop statement except the at least one function block in the software program; deploying, by the performance measurement section, each of the second plurality of patterns to the verification environment to measure a second performance; when the first performance measured by the performance measurement section fails to satisfy the desired level, generating, by the processing pattern generation section, a third plurality of patterns for offloading at least one loop statement of the software program; and deploying, by the performance measurement section, each of the third plurality of patterns to the verification environment to measure a third performance.

With this configuration, even if an environment where a plurality of types of accelerators coexist is the migration destination, the performance can be automatically improved. Further, when the migration destination has the plurality of types of accelerators in the same node, offloading is performed to the plurality of types of accelerators at the same time, thereby achieving faster offloading than in a case of using a single accelerator.

A eighth aspect of this disclosure is a non-transitory computer-readable medium storing an offload program for a computer including one or more hardware processors, the offload program causing the computer to perform steps comprising analyzing whether a source code of a software program includes at least one function block executable by an accelerator; generating a first plurality of patterns for offloading the at least one function block to the accelerator; deploying each of the first plurality of patterns for offloading the at least one function block to a verification environment and causing the verification environment to measure a first performance; when the first performance measured satisfies a desired level, generating a second plurality of patterns for offloading at least one remaining loop statement except the at least one function block in the software program and deploying each of the second plurality of patterns to the verification environment to cause the verification environment to measure a second performance; and when the first performance measured fails to satisfy the desired level, generating a third plurality of patterns for offloading at least one loop statement of the software program and deploying each of the third plurality of patterns to the verification environment to cause the verification environment to measure a third performance.

With this configuration, even if an environment where a plurality of types of accelerators coexist is the migration destination, the performance can be automatically improved. Further, when the migration destination has the plurality of types of accelerators in the same node, offloading is performed to the plurality of types of accelerators at the same time, thereby achieving faster offloading than in a case of using a single accelerator.

REFERENCE SIGNS LIST

1 Offload server
2 Cloud layer
3 Network layer
4 Device layer
10 Gateway
20 Network edge
30 Data center 11 control section
12 input/output section
13 storage section
14 Verification machine
15 Resource
111 code designation section
112 code analysis section
114 processing designation section
114a offload area extraction section
114b intermediate language file output section
115 processing pattern generation section
116 performance measurement section
116a execution file deployment section
117 execution file generation section
118 actual environment deployment section
119 performance measurement test extraction and execution section
120 provision-to-user section
130 Source code
131 Test case database
132 Intermediate language file
133 Code pattern database
141, 142 Code pattern
151 to 154 Device
80 Communication network
900 Computer
910 CPU
920 RAM
930 ROM
940 HDD
950 Communication interface
960 Input/output interface
970 Media interface
980 Recording medium

The invention claimed is:

1. An offload server comprising:
one or more hardware processors;
a code analysis section, implemented using one or more of the one or more hardware processors, configured to analyze whether a source code of a software program includes at least one function block executable by at least one accelerator;
a processing pattern generation section, implemented using one or more of the one or more hardware processors, configured to generate a first plurality of patterns for offloading the at least one function block to the at least one accelerator;
a performance measurement section, implemented using one or more of the one or more hardware processors, configured to deploy each of the first plurality of patterns for offloading the at least one function block to a verification environment to measure a first performance; and
a control section, implemented using one or more of the one or more hardware processors, configured to,
when the first performance measured by the performance measurement section satisfies a desired level, generate a second plurality of patterns for offloading at least one remaining loop statement except the at least one function block in the software program by the processing pattern generation section, and deploy each of the second plurality of patterns to the verification environment to measure a second performance by the performance measurement section, and
when the first performance measured by the performance measurement section fails to satisfy the desired level, generate a third plurality of patterns for offloading at least one loop statement of the software program by the processing pattern generation section, and deploy each of the third plurality of patterns to the verification environment to measure a third performance by the performance measurement section,
wherein the control section is further configured to try the at least one function block and then try the at least one remaining loop statement or the at least one loop statement, as a target to be offloaded to the accelerator, and
wherein the control section is further configured to try a many-core CPU, a GPU, and an FPGA in this order as the accelerator to which the at least one function block, the at least one remaining loop statement, and/or the at least one loop statement is offloaded.

2. An offload server comprising:
one or more hardware processors;
a code analysis section, implemented using one or more of the one or more hardware processors, configured to analyze whether a source code of a software program includes at least one function block executable by at least one accelerator;
a processing pattern generation section, implemented using one or more of the one or more hardware processors, configured to generate a first plurality of patterns for offloading the at least one function block to the at least one accelerator;
a performance measurement section, implemented using one or more of the one or more hardware processors, configured to deploy each of the first plurality of patterns for offloading the at least one function block to a verification environment to measure a first performance; and
a control section, implemented using one or more of the one or more hardware processors, configured to,
when the first performance measured by the performance measurement section satisfies a desired level, generate a second plurality of patterns for offloading at least one remaining loop statement except the at least one function block in the software program by the processing pattern generation section, and deploy each of the second plurality of patterns to the verification environment to measure a second performance by the performance measurement section, and
when the first performance measured by the performance measurement section fails to satisfy the desired level, generate a third plurality of patterns for offloading at least one loop statement of the software program by the processing pattern generation section, and deploy each of the third plurality of patterns to the verification environment to measure a third performance by the performance measurement section,
wherein the at least one accelerator is constituted of a plurality of types of accelerators,
wherein the control section is further configured to select, from each of the first plurality of patterns, the second plurality of patterns, and the third plurality of patterns, a pattern with a highest speed,
wherein the control section is further configured to try the at least one function block and then try the at least one remaining loop statement or the at least one loop statement, as a target to be offloaded to the accelerator, and
wherein the control section is further configured to try a many-core CPU, a GPU, and an FPGA in this order as the accelerator to which the at least one function block, the at least one remaining loop statement, and/or the at least one loop statement is offloaded.

3. An offload server comprising:
one or more hardware processors;
a code analysis section, implemented using one or more of the one or more hardware processors, configured to analyze whether a source code of a software program includes at least one function block executable by at least one accelerator;
a processing pattern generation section, implemented using one or more of the one or more hardware processors, configured to generate a first plurality of patterns for offloading the at least one function block to the at least one accelerator;
a performance measurement section, implemented using one or more of the one or more hardware processors, configured to deploy each of the first plurality of patterns for offloading the at least one function block to a verification environment to measure a first performance; and
a control section, implemented using one or more of the one or more hardware processors, configured to,
when the first performance measured by the performance measurement section satisfies a desired level, generate a second plurality of patterns for offloading at least one remaining loop statement except the at least one function block in the software program by the processing pattern generation section, and deploy each of the second plurality of patterns to the verification environment to measure a second performance by the performance measurement section, and
when the first performance measured by the performance measurement section fails to satisfy the desired level, generate a third plurality of patterns for offloading at least one loop statement of the software program by the processing pattern generation section, and deploy each of the third plurality of patterns to the verification environment to measure a third performance by the performance measurement section,
wherein the at least one accelerator is a plurality of accelerators,
wherein the at least one function block is a plurality of function blocks,
wherein the at least one remaining loop statement for which the second performance is measured or the at least one loop statement for which the third performance is measured is a plurality of performance-measured loop statements, and
wherein the control section is further configured to, regarding offloading of the plurality of function blocks or the plurality of performance-measured loop statements:
when a pattern faster than original processing is found for plural ones of the plurality of accelerators and a same function block or a same loop statement can be offloaded to the plural ones of the plurality of accelerators, select an accelerator providing higher performance as an offload destination among the plural ones of the plurality of accelerators;
when first different function blocks among the plurality of function blocks or first different loop statements among the plurality of performance-measured loop statements can be offloaded to first different accelerators among the plurality of accelerators and cannot be offloaded to the first different accelerators of a same node,
select an accelerator providing higher performance as an offload destination among the first different accelerators; and
when second different function blocks among the plurality of function blocks or second different loop statements among the plurality of performance-measured loop statements can be offloaded to second different accelerators among the plurality of accelerators and can be offloaded to the second different accelerators of a same node,
select the second different accelerators of the same node as offload destinations of the second different blocks or the second different loop statements.

4. An offload server comprising:
one or more hardware processors;
a code analysis section, implemented using one or more of the one or more hardware processors, configured to analyze whether a source code of a software program includes at least one function block executable by at least one accelerator;
a processing pattern generation section, implemented using one or more of the one or more hardware processors, configured to generate a first plurality of patterns for offloading the at least one function block to the at least one accelerator;
a performance measurement section, implemented using one or more of the one or more hardware processors, configured to deploy each of the first plurality of patterns for offloading the at least one function block to a verification environment to measure a first performance; and
a control section, implemented using one or more of the one or more hardware processors, configured to,
when the first performance measured by the performance measurement section satisfies a desired level, generate a second plurality of patterns for offloading at least one remaining loop statement except the at least one function block in the software program by the processing pattern generation section, and deploy each of the second plurality of patterns to the verification environment to measure a second performance by the performance measurement section, and
when the first performance measured by the performance measurement section fails to satisfy the desired level, generate a third plurality of patterns for offloading at least one loop statement of the software program by the processing pattern generation section, and deploy each of the third plurality of patterns to the verification environment to measure a third performance by the performance measurement section,
wherein the at least one remaining loop statement for which the second performance is measured or the at least one loop statement for which the third performance is measured is at least one performance-measured loop statement, and
wherein the control section is further configured to, regarding offloading of the at least one function block and the at least one performance-measured loop statement:
when an offload destination of the at least one performance-measured loop statement is a node different from an offload destination of the at least one function block,
try a pattern for offloading the at least one function block and not try a pattern for offloading the at least one performance-measured loop statement when a first performance improvement by offloading the at least one performance-measured loop statement is less than or equal to a second performance improvement by offloading the at least one function block, and try a pattern for offloading the at least one performance-measured loop statement and not try a pattern for offloading the at least one function block when the first performance improvement exceeds the second performance improvement; and when the offload destination of the at least one performance-measured loop statement is a same node as the offload destination of the at least one function block, try a pattern for offloading the at least one function block and the at least one performance-measured loop statement.

* * * * *